(12) United States Patent
Choi et al.

(10) Patent No.: US 8,665,321 B2
(45) Date of Patent: Mar. 4, 2014

(54) IMAGE DISPLAY APPARATUS AND METHOD FOR OPERATING THE SAME

(75) Inventors: Tacksung Choi, Seoul (KR); Sungyong Yoon, Seoul (KR); Hyunkook Lee, Seoul (KR); Junghwan Hwang, Seoul (KR); Dongseok Kim, Seoul (KR); Byeongmoon Jeon, Seoul (KR); Jaewon Sung, Seoul (KR)

(73) Assignee: LG Electronics Inc., Seoul (KR)

( * ) Notice: Subject to any disclaimer, the term of this patent is extended or adjusted under 35 U.S.C. 154(b) by 330 days.

(21) Appl. No.: 13/155,122

(22) Filed: Jun. 7, 2011

(65) Prior Publication Data

US 2012/0002024 A1    Jan. 5, 2012

(30) Foreign Application Priority Data

Jun. 8, 2010    (KR) .................. 10-2010-0053874
Sep. 17, 2010  (KR) .................. 10-2010-0091832

(51) Int. Cl.
*H04N 13/04*    (2006.01)
*H04R 5/00*     (2006.01)
*G06K 9/00*     (2006.01)

(52) U.S. Cl.
USPC .............. 348/54; 381/17; 381/18; 382/154

(58) Field of Classification Search
None
See application file for complete search history.

(56) References Cited

U.S. PATENT DOCUMENTS

| 2003/0053680 | A1* | 3/2003 | Lin et al. ................... 382/154 |
| 2008/0037796 | A1* | 2/2008 | Jot et al. ..................... 381/17 |
| 2009/0259479 | A1* | 10/2009 | Kjoerling et al. ............ 704/500 |
| 2010/0260483 | A1* | 10/2010 | Strub .......................... 386/97 |
| 2010/0278346 | A1* | 11/2010 | Hogue et al. ................. 381/18 |
| 2012/0314872 | A1* | 12/2012 | Tan et al. .................... 381/17 |
| 2013/0010969 | A1* | 1/2013 | Cho et al. .................... 381/17 |

* cited by examiner

*Primary Examiner* — Joseph Ustaris
*Assistant Examiner* — Rebecca Volentine
(74) *Attorney, Agent, or Firm* — Birch, Stewart, Kolasch & Birch, LLP

(57) ABSTRACT

An image display apparatus and a method for operating the same are disclosed. The method for operating an image display apparatus includes receiving a 3-dimensional (3D) image, detecting the depth of the 3D image, performing 3D processing on an audio signal received in synchronization with the 3D image in correspondence with the detected depth, and outputting the audio signal subjected to 3D processing. Thus, it is possible to output the audio signal in correspondence with the depth of the 3D image during 3D image display.

18 Claims, 20 Drawing Sheets

FIG. 5
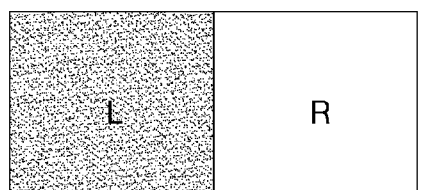
(a)
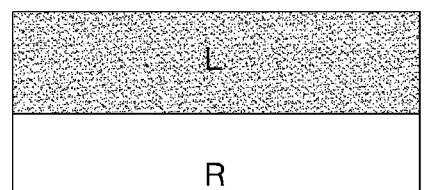
(b)
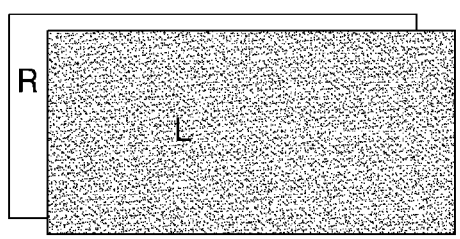
(c)
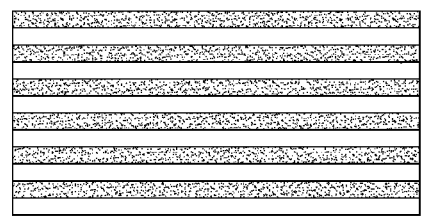
(d)
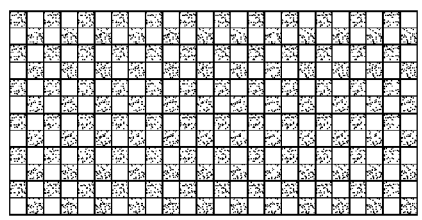
(e)

FIG. 6
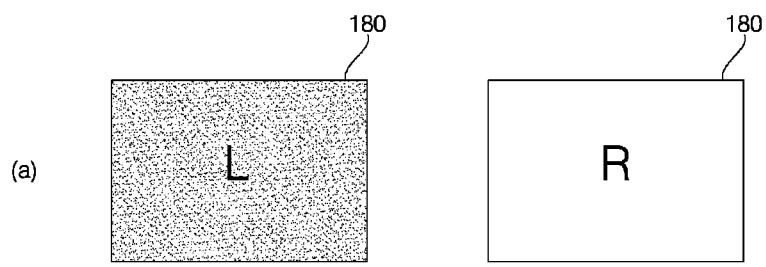
(a)
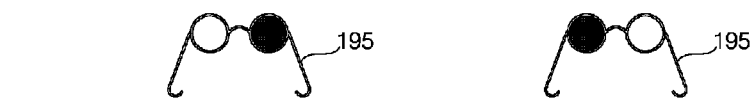
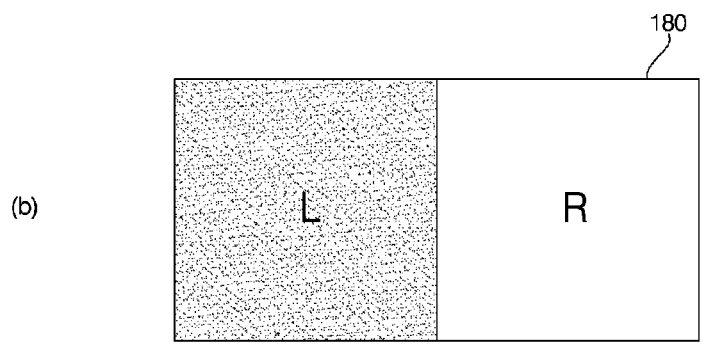
(b)

IMAGE DISPLAY APPARATUS AND METHOD FOR OPERATING THE SAME

CROSS-REFERENCE TO RELATED APPLICATION

This application claims the benefit of Korean Application Nos. 10-2010-0053874, filed on Jun. 8, 2010 and 10-2010-0091832, filed on Sep. 17, 2010, the disclosure of which is incorporated herein by reference.

BACKGROUND OF THE INVENTION

1. Field of the invention

The present invention relates to an image display apparatus and a method for operating the same, and more particularly, to an image display apparatus and a method for operating the same which can output an audio signal in correspondence with a depth during 3D image display.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services.

Extensive research has recently been conducted on three-dimensional (3D) images. In addition, 3D stereoscopy has been widely used and commercialized in a variety of environments and technologies.

SUMMARY OF THE INVENTION

Therefore, the present invention has been made in view of the above problems, and it is an object of the present invention to provide an image display apparatus and a method for operating the same which can output an audio signal in correspondence with a depth during 3D image display.

It is another object of the present invention to provide an image display apparatus and a method for operating the same, which can output an audio signal in correspondence with object movement during 3D image display.

In accordance with an aspect of the present invention, the above and other objects can be accomplished by the provision of a method for operating an image display apparatus, including receiving a 3-dimensional (3D) image, detecting the depth of the 3D image, performing 3D processing on an audio signal received in synchronization with the 3D image in correspondence with the detected depth, and outputting the audio signal subjected to 3D processing.

In accordance with another aspect of the present invention, the above and other objects can be accomplished by the provision of a method for operating an image display apparatus, including receiving a 3-dimensional (3D) image, detecting the depth of the 3D image, and controlling sound image localization of an audio signal received in synchronization with the 3D image in correspondence with the detected depth.

In accordance with a further aspect of the present invention, there is provided an image display apparatus including: a display configured to display an image, an audio output unit configured to output an audio signal, and a controller configured to detect the depth of a 3-dimensional (3D) image or movement of an object within the 3D image, perform 3D processing on an audio signal received in synchronization with the 3D image in correspondence with the detected depth or movement, and output the audio signal subjected to 3D processing.

BRIEF DESCRIPTION OF THE DRAWINGS

The above and other objects, features and other advantages of the present invention will be more clearly understood from the following detailed description taken in conjunction with the accompanying drawings, in which:

FIG. 5 illustrates three-dimensional (3D) image formats;

FIG. 6 illustrates operations of an additional display of a glasses type according to the format illustrated in FIG. 5;

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
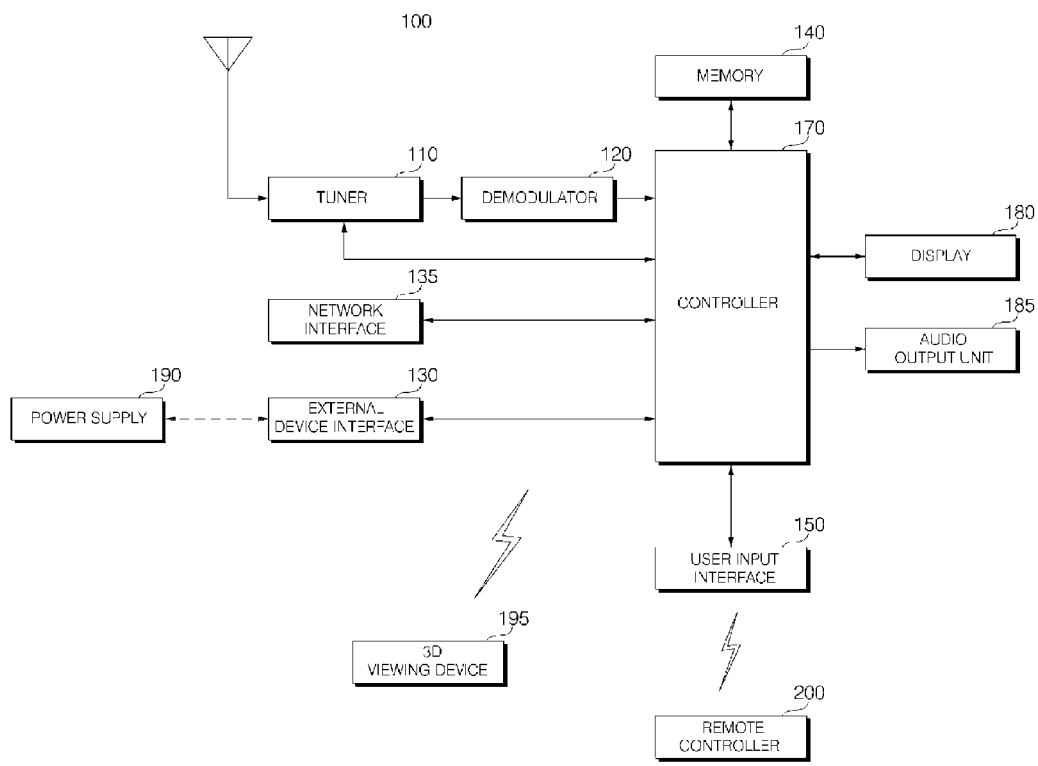
FIG. 1 is a block diagram of an image display apparatus according to an embodiment of the present invention.

FIG. 1 is a block diagram of an image display apparatus according to an embodiment of the present invention.

Referring to FIG. 1, an image display apparatus 100 according to an embodiment of the present invention includes a tuner 110, a demodulator 120, an external device interface 130, a memory 140, a network interface 150, a controller 170, a display 180, an audio output unit 185, and a three-dimensional (3D) viewing device 195.

The tuner 110 selects a Radio Frequency (RF) broadcast signal corresponding to a channel selected by a user or a number of RF broadcast signals corresponding to all broadcast channels previously added to the image display apparatus 100 by a channel add function from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner 110 downconverts the selected RF broadcast signal into a digital IF signal, DIF. On the other hand, if the selected RF broadcast signal is an analog broadcast signal, the tuner 110 downconverts the selected RF broadcast signal into an analog baseband A/V signal, CVBS/SIF. That is, the first tuner 120 may be a hybrid tuner capable of processing not only digital broadcast signals but also analog broadcast signals. The analog baseband A/V signal CUBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

In addition, the tuner 110 may sequentially select a number of RF broadcast signals corresponding to all broadcast channels previously added to the image display apparatus 100 by the channel add function from among a plurality of RF signals received through the antenna, and may downconvert the selected RF broadcast signals into IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 may perform 7-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation on the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF received from the tuner 110, thereby obtaining a stream signal TS. The stream signal TS may be a signal in which a video signal, an audio signal and a data signal are multiplexed. For example, the stream signal TS 1 may be an MPEG-2 TS signal obtained by multiplexing an MPEG-2 video signal and a Dolby AC-3 audio signal. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS is input to the controller 170. The controller 170 may demultiplex the stream signal TS into a number of signals, process the demultiplexed signals, and output the processed signals as video data to the display 180 and as audio data to the audio output unit 185.

The external device interface 130 may transmit or receive data to or from a connected external device. For the purpose, the external device interface 130 may include an A/V Input/Output (I/O) unit (not shown) and a wireless communication module (not shown).

The external device interface 130 is connected wirelessly or by cable to an external device 190 such as a Digital Versatile Disc (DVD) player, a Bluray player, a game console, a camera, a camcorder, or a computer (e.g., a laptop computer). Then, the external device interface 130 externally receives video, audio, and/or data signals from the connected external device 190 and transmits the received external input siynals to the controller 170. In addition, the external device interface 130 may output video, audio, and data signals processed by the controller 170 to the external device.

In order to receive or transmit A/V signals from or to the external device, the A/V I/O unit of the external device interface 130 may include a Universal Serial Bus (USB) port, a Composite Video Banking Sync (CUBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, The wireless communication module of the external device interface 130 may conduct short-range communication with other electronic devices. For the short-range communication, the wireless communication module may be connected to other electronic devices over a network according to communication standards such as Bluetooth, Radio Frequency Identification (RFID), Infrared Data Association (IrDA), Ultra WideBand (UWB), Zigbee, and Digital Living Network Alliance (DLNA).

The external device interface 130 may be connected to various set-top boxes through at least one of the afore-mentioned ports and may thus receive data from or transmit data to the various set-top boxes.

The external device interface 130 may transmit data to or receive data from the 3D viewing device 195.

The network interface 135 interfaces between the image display apparatus 100 and a wired/wireless network such as the Internet. The network interface 135 may include an Ethernet port for connection to a wired network. For connection to wireless networks, the network interface 135 may operate in conformance with communication standards such as Wireless Local Area Network (WLAN) (i.e. Wi-Fi), Wireless Broadband (WiBro), World Interoperability for Microwave Access (WiMax), and High Speed Downlink Packet Access (HSDPA).

The network interface 135 may receive content or data from the Internet, a content provider, or a network provider over a network. That is, the network interface 130 may receive content such as movies, advertisements, games, Video-on-Demand (VoD) files, and broadcast signals, and information related to the content provided by the Internet or a content provider over a network. The network interface 135 may also receive update information and update files of firmware from a network operator. The network interface 135 may transmit data to the Internet, the content provider, or the network provider.

The network interface 135 may be connected to, for example, an Internet Protocol (IP) TV. To enable interactive communication, the network interface 135 may provide video, audio and/or data signals received from an IPTV set-top box to the controller 170 and provide signals processed by the controller 170 to the IPTV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (HTTH-TV), TV over DSL, Video over DSL, TV over IP (TVIP), Broadband TV (BTV), Internet TV and full-browsing TV, which are capable of providing Internet access services.

The memory 140 may store various programs necessary for the controller 170 to process and control signals, and may also store processed video, audio and data signals.

The memory 140 may temporarily store a video, audio or data signal received from the external device interface 130. The memory 140 may store information about broadcast channels identified through the channel add function, such as a channel map.

The memory 140 may include, for example, at least one of a flash memory-type storage medium, a hard disk-type storage medium, a multimedia card micro-type storage medium, a card-type memory, a Random Access Memory (RAM), or a Read-Only Memory (ROM) such as an Electrically Erasable Programmable ROM (EEPROM). The image display apparatus 100 may open a file (such as a video file, a still image file, a music file, or a text file) stored in the memory 140 to the user.

While the memory 140 is shown in FIG. 1 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a user input signal received from a sensor unit (not shown) that senses a user's gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 130 and process the demultiplexed signals so that the processed signals can be output as audio and video data.

The video signal processed by the controller 170 may be displayed as an image on the display 180. The video signal processed by the controller 170 may also be transmitted to an external output device through the external device interface 130.

The audio signal processed by the controller 170 may be output as sound to the audio output unit 185. Also, the audio signal processed by the controller 170 may be transmitted to the external output device through the external device interface 130.

While not shown in FIG. 1, the controller 170 may include a demultiplexer (DEMUX) and a video processor, which will be described later with reference to FIG. 2.

In addition, the controller 170 may provide overall control to the image display apparatus 100. For example, the controller 170 may control tuning of the tuner 110 to an RF broadcast corresponding to a user-selected channel or a pre-stored channel.

The controller 170 may control the image display apparatus 100 according to a user command received through the user input interface 150 or according to an internal program.

For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device 190 such as a camera or a camcorder through the external device interface 130 to the display 180 or to the audio output unit 185 according to an external device video play command received through the external device interface 150.

The controller 170 may control display of images on the display 180. For instance, the controller 170 may control the display 180 to display a broadcast image received from the tuner 110, an external image received through the external device interface 130, an image received through the network interface 130, or an image stored in the memory 140.

The image displayed on the display 180 may be a two-dimensional (2D) or 3D still image or moving picture.

The controller 170 controls a particular object in the image displayed on the display 180 to be rendered as a 3D object. For example, the particular object may be at least one of a linked Web page (e.g. from a newspaper, a magazine, etc.), an Electronic Program Guide (EPG), a menu, a widget, an icon, a still image, a moving picture, or text.

This 3D object may be processed to have a different depth from the image displayed on the display 180. Preferably, the 3D object may appear protruding relative to the image displayed on the display 180.

The controller 170 may locate the user based on an image captured by a camera unit (not shown). Specifically, the controller 170 may measure the distance (a z-axis coordinate) between the user and the image display apparatus 100. In addition, the controller 170 may calculate x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded or without encoding. Also, it is possible to encode the thumbnail images into a stream and output the stream to the controller 170. The controller 170 may display a thumbnail list including a plurality of received thumbnail images on the display 180. The thumbnail list may be displayed on a part of the display 180 with an image displayed on the display 180, that is, as a compact view, or the thumbnail list may be displayed in full screen on the display 180. The thumbnail images in such a thumbnail list may be sequentially updated.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 is preferably capable of displaying 3D images according to an embodiment of the present invention.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc. As special 3D glasses, polarized glasses operate in a passive manner, whereas shutter glasses operate in an active manner. Also, HMD types may be categorized into passive ones and active ones.

According to an embodiment of the present invention, in order to allow the user to view 3D images, 3D glasses will be focused upon as the 3D viewing device 195. The 3D viewing device 195 may include passive type polarization glasses or active type shutter glasses. The 3D viewing device 195 further includes the above-described HMT type glasses.

The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as voice. The audio output unit 185 may be various types of speakers.

To sense a user's gesture, the image display apparatus 100 may further include the sensor unit (not shown) that has at least one of a touch sensor, a voice sensor, a position sensor, or a motion sensor, as stated before. A signal sensed by the sensor unit may be output to the controller 170 through the user input interface 150.

The controller 170 may sense a user's gesture from an image captured by the camera unit or a signal sensed by the sensor unit, or by combining the captured image and the sensed signal.

The remote controller 200 transmits a user input to the user input interface 150. For the transmission of a user input, the remote controller 200 may operate based on various communication standards such as Bluetooth, RF, IR, UWB and Zig-Bee. In addition, the remote controller 200 may receive a video signal, audio signal and/or data signal from the user input interface 150 and output the received signal as an image or sound.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs. Alternatively, the image display apparatus 100 may be a mobile digital broadcast receiver capable of at least one of terrestrial DMB broadcast programs, satellite DMB broadcast programs, ATSC-M/H broadcast programs, DVB-H (COFDM) broadcast programs, and Media Forward Link Only (MediaFLO) broadcast programs, or a mobile digital broadcast receiver capable of receiving cable, satellite and/or IPTV broadcast programs.

The image display apparatus 100 as set forth herein may be any of a TV receiver, a mobile phone, a smart phone, a laptop computer, a digital broadcast terminal, a Personal Digital Assistant (PDA), a Portable Multimedia Player (PMP), etc.

The image display apparatus 100 as set forth herein may include a set-top box, an optical disc player, etc. which perform video signal processing or audio signal processing without a display. That is, the image display apparatus as set forth herein may include a system including a set-top box and a display.

The block diagram of the image display apparatus 100 illustrated in FIG. 1 is an exemplary embodiment of the present invention. The image display apparatus 100 is shown in FIG. 1 as having a number of components in a given configuration. However, the image display apparatus 100 may include fewer components or more components than those shown in FIG. 1 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

Figure 2:
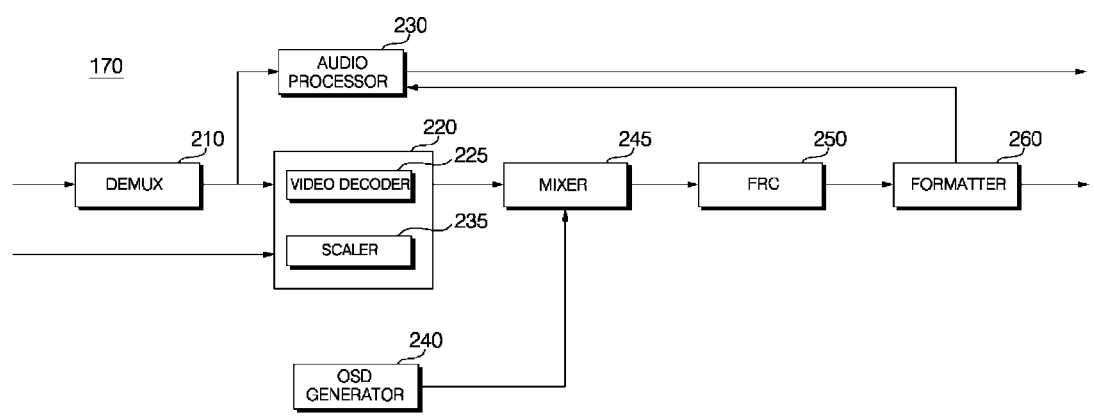
FIG. 2 is a block diagram of a controller illustrated in FIG. 1.
Figure 3:
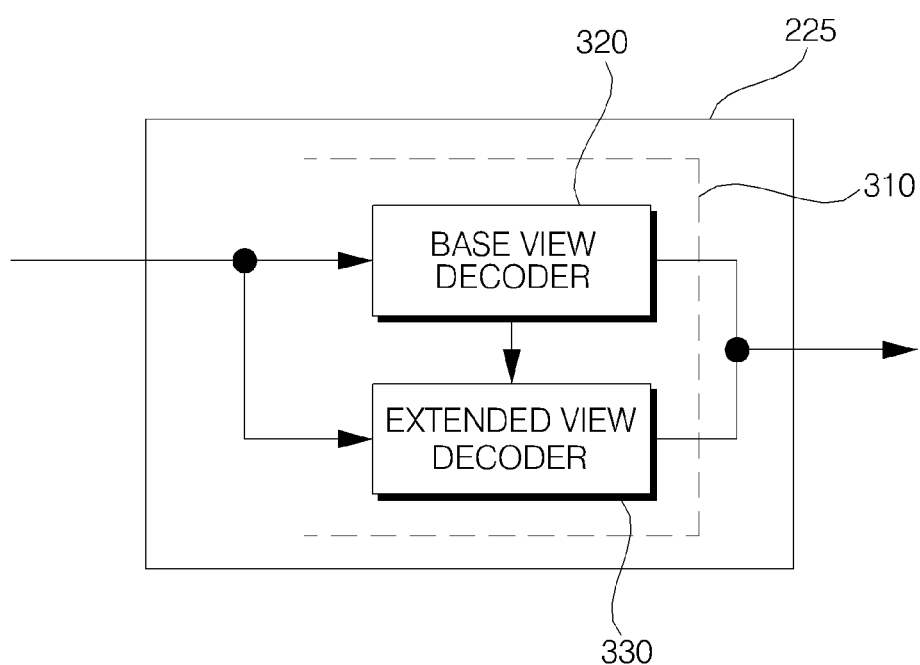
FIG. 3 is a block diagram of a video decoder illustrated in FIG. 2.
Figure 4A:
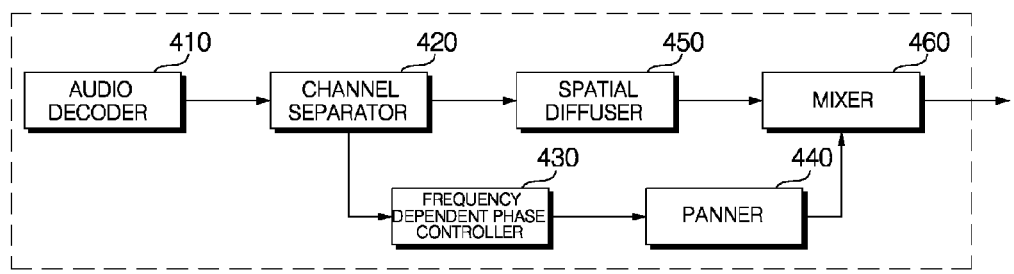
FIG. 4A is a diagram of an example of an audio processor illustrated in FIG. 2.
Figure 4B:
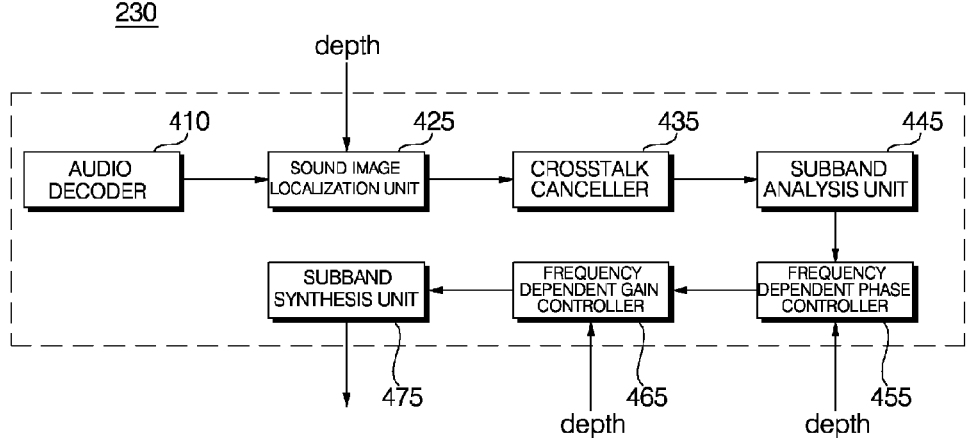
FIG. 4B is a diagram of another example of the audio processor illustrated in FIG. 2.

FIG. 2 is a block diagram of a controller illustrated in FIG. 1, FIG. 3 is a block diagram of a video decoder illustrated in FIG. 2, FIG. 4A is a diagram of an example of an audio processor illustrated in FIG. 2, FIG. 4B is a diagram of another example of the audio processor illustrated in FIG. 2, FIG. 5 illustrates three-dimensional (3D) image formats, and FIG. 6 illustrates operations of an additional display of a glasses type according to a format illustrated in FIG. 5.

Referring to FIG. 2, the controller 170 according to the embodiment of the present invention may include a demultiplexer (DEMUX) 210, a video processor 220, an GSD generator 240, a mixer 245, a Frame Rate Converter (FRC) 250, and a formatter 260. The controller 170 may further include an audio processor 230 and a data processor (not shown).

The DEMUX 210 demultiplexes an input stream. For example, the DEMUX 210 may demultiplex an MPEG-2 TS into a video signal, an audio signal, and a data signal. The stream signal input to the DEMUX 210 may be received from the tuner 110, the demodulator 120 or the external device interface 130.

The video processor 220 may process the demultiplexed video signal. For video signal processing, the video processor 220 may include a video decoder 225 and a scaler 235.

The video decoder 225 decodes the demultiplexed video signal and the scaler 235 scales the resolution of the decoded video signal so that the video signal can be displayed on the display 180.

The video decoder 225 may be provided with decoders that operate based on various standards. For example, the video decoder 225 may include at least one of an MPEG-2 decoder, an H.264 decoder, an MPEG-C decoder (MPEG-C part 3), an MVC decoder and an FTV decoder.

FIG. 3 shows a 3D video decoder 310 for decoding a 3D video signal in the video decoder 225.

The demultiplexed video signal input to the 3D video decoder 310 may be a video signal encoded by Multi-view Video Coding (MVC), a video signal encoded by dual AVC, or a mixture of an encoded left-eye video signal and an encoded right-eye video signal.

If the input signal is a mixture of an encoded left-eye video signal and an encoded right-eye video signal as described above, a 2D video decoder may be used. For example, if the demultiplexed video signal is an MPEG-2 encoded video signal or an AVC encoded video signal, the video signal may be decoded using an MPEG-2 decoder or an AVC decoder.

The 3D video decoder 310 is an MVC decoder, which includes a base view decoder 320 and an extended view decoder 330.

For example, if the extended view video signal of the encoded 3D video signal input to the 3D video decoder 310 is encoded by MVC, the base view video signal must be decoded in order to decode the extended view video signal. In order to decode base view video signal, the base view video signal decoded by the base view decoder 320 is sent to the extended view decoder 330.

As a result, the decoded 3D video signal output from the 3D video decoder 310 is delayed by a predetermined time until decoding of the extended view decoder is completed. The decoded base view video signal and the decoded view video signal are mixed and output.

In addition, for example, if the extended view video signal of the encoded 3D video signal input to the 3D video decoder 310 is encoded by AVC, unlike the above MVC, the base view video signal and the extended view video signal can be decoded in parallel. Accordingly, the base view decoder 320 and the extended view decoder 330 independently perform the decoding operations. The decoded base view video signal and the decoded base view video signal are mixed and output.

The 3D video decoder 310 may include a color image decoder and a depth image decoder, unlike in FIG. 3. That is, if a stereoscopic image including a color image and a depth image is encoded, a color image decoder may decode a color image and a depth image decoder may decode a depth image. For depth image decoding, the color image may be used as a reference image.

The video signal decoded by the video processor 220 may include a 2D video signal, a mixture of a 2D video signal and a 3D video signal, or a 3D video signal.

For example, if an external video signal received from the external device 190 or a broadcast video signal received from the tuner 110 includes a 2D video signal, a mixture of a 2D video signal and a 3D video signal, or a 3D video signal. Thus, the controller 170 and, more particularly, the video processor 220 may perform signal processing and output a 2D video signal, a mixture of a 2D video signal and a 3D video signal, or a 3D video signal.

The decoded video signal from the video processor 220 may have any of various available formats. For example, the decoded video signal may be a 3D video signal with a color image and a depth image or a 3D video signal with multi-viewpoint image signals. The multi-viewpoint image signals may include, for example, a left-eye image signal and a right-eye image signal.

For 3D visualization, 3D formats illustrated in FIG. 5 are available. The 3D formats are a side-by-side format (FIG. 5(*a*)), a top/down format (FIG. 5(*b*)), a frame sequential format (FIG. 5(*c*)), an interlaced format (FIG. 5(*d*)), and a checker box format (FIG. 5(*e*)).

The OSD generator 240 generates an OSD signal autonomously or according to a user input. For example, the OSD generator 240 may generate signals by which a variety of information is displayed as graphics or text on the display 180, according to user input signals or control signals. The OSD signal may include various data such as a User Interface (UI), a variety of menus, widgets, icons, etc. Also, the OSD signal may include a 2D object and/or a 3D object.

The mixer 245 may mix the decoded video signal processed by the video processor 220 with the OSD signal generated from the OSD generator 240. The OSD signal and the decoded video signal each may include at least one of a 2D signal or a 3D signal. The mixed video signal is provided to the FRC 250.

The FRC 250 may change the frame rate of the mixed video signal received from the mixer 245. For example, a frame rate of 60 Hz is converted into a frame rate of 120 or 240 Hz. When the frame rate is changed from 60 Hz to 120 Hz, the same first frame is inserted between a first frame and a second frame, or a third frame predicted from the first and second frames is inserted between the first and second frames. If the frame rate is changed from 60 Hz to 240 Hz, three identical frames or three predicted frames are inserted between the first and second frames.

The FRC 250 may output an input frame rate without frame rate conversion. Preferably, if a 2D video signal is input, the frame rate may remain unchanged. If a 3D video signal is input, the frame rate may be converted as described above.

The formatter 260 may separate a 2D video signal and a 3D video signal from the mixed video signal of the OSD signal and the decoded video signal received from the mixer 245.

Herein, a 3D video signal refers to a signal including a 3D object such as a Picture-In-Picture (PIP) image (still or moving), an EPG that describes broadcast programs, a menu, a widget, text, an object within an image, a person, a background, or a Web page (e.g. from a newspaper, a magazine, etc.).

The formatter 260 may change the format of the 3D video signal, for example, to one of the various formats illustrated in FIG. 5. As shown in FIG. 6, an operation of an additional display of a glasses type may be performed according to the format.

FIG. 6(*a*) illustrates an exemplary operation of the 3D viewing device 195 and, more particularly, the shutter glasses 195 in the case where the formatter 260 outputs the frame sequential format illustrated in FIG. 5.

When the left-eye image L is displayed on the display 180, the left lens of the shutter glasses 195 is openend and the right lens is closed. When the right-eye image R is displayed on the display 180, the left lens of the shutter glasses 195 is closed and the right lens is opened.

FIG. 6(*b*) illustrates an exemplary operation of the 3D viewing device 195 and, more particularly, the polarization glasses 195 in the case where the formatter 260 outputs the side-by-side format illustrated in FIG. 5. The 3D viewing device 195 illustrated in FIG. 6(*b*) may be shutter glasses. The shutter glasses may operate like the polarization glasses by maintaining both the left-eye lens and the right-eye lens in an open state.

Meanwhile, the formatter 260 may convert a 2D video signal into a 3D video signal. For example, the formatter 260 may detect edges or a selectable object from the 2D video signal and generate a 3D video signal with an object based on the detected edges or the selectable object. As described before, the 3D video signal may be separated into left-eye and right-eye image signals L and R.

The audio processor 230 of the controller 170 may process the demultiplexed audio signal.

The audio processor 230 may include an audio decoder 410, a channel separator 420, a frequency dependent phase controller 430, a panner 440, a spatial diffuser 450, and a mixer 460, as shown in FIG. 4A.

For audio signal processing, the audio processor may have a plurality of decoders.

If the demultiplexed audio signal is a coded audio signal, the audio processor of the controller 170 may decode the audio signal. For example, if the demultiplexed audio signal is an MPEG-2 coded audio signal, it may be decoded by an MPEG-2 decoder. If the demultiplexed audio signal is an MPEG-4 Bit Sliced Arithmetic Coding (BSAC) coded audio signal for terrestrial DMB, it may be decoded by an MPEG-4 decoder. If the demultiplexed audio signal is an MPEG-2 Advanced Audio Coding (AAC) coded audio signal for satellite DMB or DVB-H, it may be decoded by an AAC decoder. If the demultiplexed audio signal is a Dolby AC-3 coded audio signal, it may be decoded by an AC-3 decoder.

The channel separator 420 separates an input audio signal according to channels. For example, the audio signal may be separated into a rear-channel audio signal and a front-channel audio signal. The rear-channel audio signal is output at the rear side of the image display apparatus 100 and the front-channel audio signal is output at the front side of the image display apparatus 100. The audio signal is separated into 5.1-channel audio signals. A stereo audio signal may be separated into a left-channel audio signal and a right-channel audio signal.

The frequency dependent phase controller 430 receives a separated first-channel audio signal from the channel separator 420 and separates the signal according to a plurality of frequency bands. The phase of the audio signal is controlled according to the plurality of frequency bands.

Such phase control may be performed based on the detected depth information. For example, if the phase of an audio signal having a predetermined frequency is delayed by 180 degrees, the audio signal is perceived as being output at a position closer to the user.

The phase of the audio signal is controlled in a z axis (a distance between the user and the display 180) by changing a phase angle in the frequency dependent phase controller 430.

The panner 440 receives the audio signal from the channel separator 420 or the frequency dependent phase controller 430 and performs signal processing so as to pan the audio signal. The panner 440 may perform signal processing such that the sense of the direction of the audio signal is increased in terms of the left and right (x- and y-axis) directions of the display 180.

For example, the levels of a left-channel audio signal L and a right-channel audio signal RA of the front-channel signals are different. If the level of the left-channel audio signal is greater than that of the right-channel audio signal, the audio signal is output at the left channel so as to approach the vicinity of the right channel.

For example, output times of the right-channel audio signal and the left-channel audio signal are differently set, thus obtaining the above-described effect. Thus, the stereophonic effect of the audio signal is increased.

The spatial diffuser 450 receives a separated second-channel audio signal from the channel separator 420 and controls spatial diffusion of the audio signal of the second channel. For spatial diffusion, the spatial diffuser 450 adds reverb sound to the rear-channel audio signal, delays the time of the rear-channel audio signal or increases the level of the rear-channel audio signal, thereby increasing the stereophobic effect of the channel.

The mixer 460 mixes the first-channel audio signal and the second-channel audio signal separated by the channel separator 420 and outputs the mixed audio signal. The mixed audio signal may be input to the audio output unit 185.

The audio processor 230 may include an audio decoder 410, a sound image localization unit 425, a crosstalk canceller 435, a subband analysis unit 445, a frequency dependent phase controller 455, a frequency dependent gain controller 465, and a subband synthesis unit 475, as shown in FIG. 4B.

The audio decoder 410 may be equal to the audio decoder 410 shown in FIG. 4A and thus a description thereof will be omitted.

The sound image localization unit 425 controls sound image localization of the decoded audio signal. Sound image localization refers to the location of a perceived sound image. For example, if the stereo audio signals of the left and right channels are identical, sound image localization may be the middle of a left speaker and a right speaker.

Sound image localization may enable a listener to perceive a sound source as being located at a specific location (specific direction) of a sound-field space, based on a phase difference (time difference) and a level ratio (sound pressure level ratio) of the audio signal which reaches the listener's ears.

For sound image localization control, in the embodiment of the present invention, the decoded audio signal may be subjected to Head-Related Transfer Function (HRTF) filtering.

HRTF refers to a transfer function between a sound wave output from a sound source located at a predetermined position and a sound wave which reaches an eardrum. The HRTF may be acquired by inserting a microphone into an ear of a listener or an ear of a life-sized model of a person and measuring an impulse response of an audio signal at a specific angle.

The HRTF may be changed according to the height and the orientation of a sound source. The HRTF may be changed according to body characteristics such as head shape, head size or ear shape.

In the embodiment of the present invention, the HRTF may be changed in correspondence with the depth of a 3D image. For example, on the assumption that the location of the sound source may be changed in correspondence with the depth of the 3D image, HRTF may be set based on the sound source which is changed according to the depth of the 3D image. That is, the coefficient of the HRTF may be changed according to the depth of the 3D image. In particular, the coefficient of the HRTF may be controlled such that a high frequency component is eliminated as the depth of the 3D image or a change in depth of the 3D image is increased.

The HRTF or the coefficient of the HRTF according to the depth of the 3D image may be measured in advance and stored in the memory 140.

The sound image localization method using HRTF according to the depth of the 3D image can provide a 3D effect such as a space sense or a sense of reality.

HRTF filtering may be performed based on a mono audio signal. For example, convolution of a mono audio signal and an impulse response of a first HRTF and convolution of a mono audio signal and an impulse response of a second HRTF may be performed so as to generate a left-channel audio signal and a right-channel audio signal. Thus, it is possible to perform sound image localization.

If a multi-channel audio signal is input, HRFT filtering of each channel is performed and left-channel audio signals and right-channel audio signals may be generated, summed and output.

The crosstalk canceller 435 performs signal processing for canceling crosstalk of the audio signal, the sound image localization of which is controlled. That is, in order to prevent a phenomenon (crosstalk) wherein sound which is processed to reach a left ear reaches a right ear such that a listener cannot perceive the direction of a virtual sound source, an additional audio signal for canceling crosstalk may be generated.

For example, the crosstalk canceller 435 may add a plurality of reverb components having a delay time to a difference signal between the right-channel audio signal and the left-channel audio signal.

Then, the left-channel audio signal and the right-channel audio signal passing through the crosstalk canceller 435 are heard in the respective ears (the left ear and the right ear) of the listener.

Signal processing for canceling crosstalk is performed based on a time domain, but the present invention is not limited thereto. Signal processing for canceling crosstalk may be performed based on a frequency domain.

The crosstalk canceller 435 may be optionally included. That is, the left-channel audio signal and the right-channel audio signal output from the sound image localization unit 425 may be directly input to the subband analysis unit 445.

The subband analysis unit 445 performs subband analysis filtering with respect to the audio signal, the sound image localization of which is controlled. That is, the subband analysis unit 445 includes a subband analysis filter bank and filters an audio signal having predetermined frequency subband among the audio signal, the sound image localization of which is controlled. The number of subbands of the audio signal filtered by the subband analysis unit 445 may be 32 or 64.

The frequency dependent phase controller 455 and the frequency dependent gain controller 465 may respectively control the phases and the gains of the separated audio signals according to frequency bands or frequency band groups.

The frequency dependent phase controller 455 controls the phase of the audio signal according to frequency bands. The phase of the audio signal may be controlled based on the depth of the 3D image or the change in depth of the 3D image. As the depth of the 3D image or the change in depth of the 3D image is increased, the phase is preferably increased. The phase may be increased to an upper limit value. If the depth of the 3D image or the change in the depth of the 3D image is very small, that is, if the depth of the 3D image or the change in depth of the 3D image is less than a predetermined value, the phase of the audio signal may not be controlled.

For example, if the phase of the audio signal having a predetermined frequency is increased by 180 degrees, the audio signal may be perceived as being output at a position closer to a user.

The phase control method may be performed using various methods. For example, a specific frequency range may be divided into a plurality of frequency bands and the signs of the phases of the signals of the respective channels may be changed according to the plurality of frequency bands, a plurality of frequency bands in a specific frequency range may be grouped and the signs of the phases of the signals of the respective channels may be changed according to frequency band groups, the phases of the signals of the channels in the entire frequency band may be independently controlled, a specific frequency range is divided into a plurality of frequency bands and the phases of the signals of the channels may be controlled according to the plurality of frequency bands, or frequency bands in a specific frequency range may be grouped and the phases of the signals of the channels may be controlled according to the frequency band groups.

The phase of the audio signal is controlled such that a high frequency component is eliminated as the depth of the 3D image or the change in depth of the 3D image is increased.

The control of the phase of the audio signal according to the depth of the 3D image may be performed based on an average depth or a maximum depth of the 3D image. For example, if a plurality of 3D objects is included in the 3D image, the average depth of the 3D objects is detected and the phase of the audio signal is controlled based on the average depth or the phase of the audio signal is controlled based on a maximum depth, that is, the depth of an object positioned closest to the listener among the 3D objects.

The frequency dependent gain controller 465 controls the gain of the audio signal according to frequency bands. Gain control may be performed based on the depth of the 3D image or the change in depth of the 3D image. The gain is preferably increased as the depth of the 3D image or the change in depth of the 3D image is increased.

For example, if the depth of the 3D image is doubled, the gain of the audio signal increases fourfold. If the depth of the 3D image increases fourfold, the gain of the audio signal increases eightfold. A zooming band of the audio signal may be emphasized according to the depth of the 3D image.

The gain control method may be performed using various methods. For example, the gains of the audio signals may be independently controlled in the entire frequency band, a specific frequency range may be divided into a plurality of frequency bands and the gains of the audio signals may be controlled according to the plurality of frequency bands, or a plurality of frequency bands may be grouped and the gains of the audio signals may be controlled according to frequency band groups.

For example, the gain of the audio signal having a frequency band of 1000 Hz to 4000 Hz may be controlled and the gain of the audio signal having other frequency bands may not be controlled.

Gain control may be performed such that a high frequency component is eliminated as the depth of the 3D image or the change in depth of the 3D image is increased.

The control of the gain according to the depth of the 3D image may be performed based on an average depth or a maximum depth of the 3D image. For example, a plurality of 3D objects is included in the 3D image, the average depth of the 3D objects is detected and the gain of the audio signal is controlled based on the average depth or the phase is controlled based on a maximum depth, that is, the depth of an object positioned closest to the listener among the 3D objects.

The subband synthesis unit 475 performs subband synthesis filtering with respect to the audio signal, the phase or the gain of which is controlled. That is, the subband synthesis unit 475 includes a subband synthesis filter bank and synthesizes 32 subbands or 64 subbands. Finally, an audio signal which is subjected to sound image localization, phase control and gain control is output according to the depth of the 3D image. The audio signal is zoomed according to the depth of the 3D image so as to be output in front of the head of the listener.

Sound image localization, phase control and gain control may be selectively performed according to the depth of the 3D image. That is, at least one of sound image localization, phase control and gain control may be performed according to the depth of the 3D image. For example, only phase control may be performed according to the depth of the 3D image or only gain control may be performed according to the depth of the 3D image. Alternatively, both sound image localization and phase control or depth control may be performed according to the depth of the 3D image.

Although not shown in FIG. 4B, a channel separator 420 may be included between the audio decoder 410 and the sound image localization unit 425.

The audio processor of the controller 170 may also adjust the bass, treble, and volume of the audio signal.

The data processor (not shown) of the controller 170 may process the demultiplexed data signal. For example, if the demultiplexed data signal is a coded signal, the controller 170 may decode the demultiplexed data signal. The coded data signal may be an EPG which includes broadcast information specifying the start time, end time, etc. of broadcast programs of each channel. Examples of an EPG include ATSC-Program and System Information Protocol (ATSC-PSIP) information and DVB-Service Information (DVB-SI). ATSC-PSIP information or DVB-SI information may be included in the header of a TS, i.e., a 2-byte header of an MPEG-2 TS.

Although it is shown in FIG. 2 that the mixer 345 mixes signals received from the OSD generator 240 and the video processor 220 and then the formatter 260 performs 3D processing upon the mixed signal, the present invention is not limited thereto and the mixer may be positioned after the formatter. Thus the formatter 260 may perform 3D processing on a signal received from the video processor 220, the OSD generator 240 may generate an OSD signal and subject the OSD signal to 3D processing, and then the mixer 245 may mix the processed 3D signals received from the formatter 260 and the OSD generator 240.

The block diagram of the controller 170 illustrated in FIG. 2 is purely exemplary. Depending upon the specifications of the controller 170 in actual implementation, the components of the controller 170 may be combined or omitted or new components may be added. That is, two or more components are incorporated into one component or one component may be configured as separate components, as needed.

Especially, the FRC 250 and the formatter 260 may be configured separately outside the controller 170.

Figure 7:
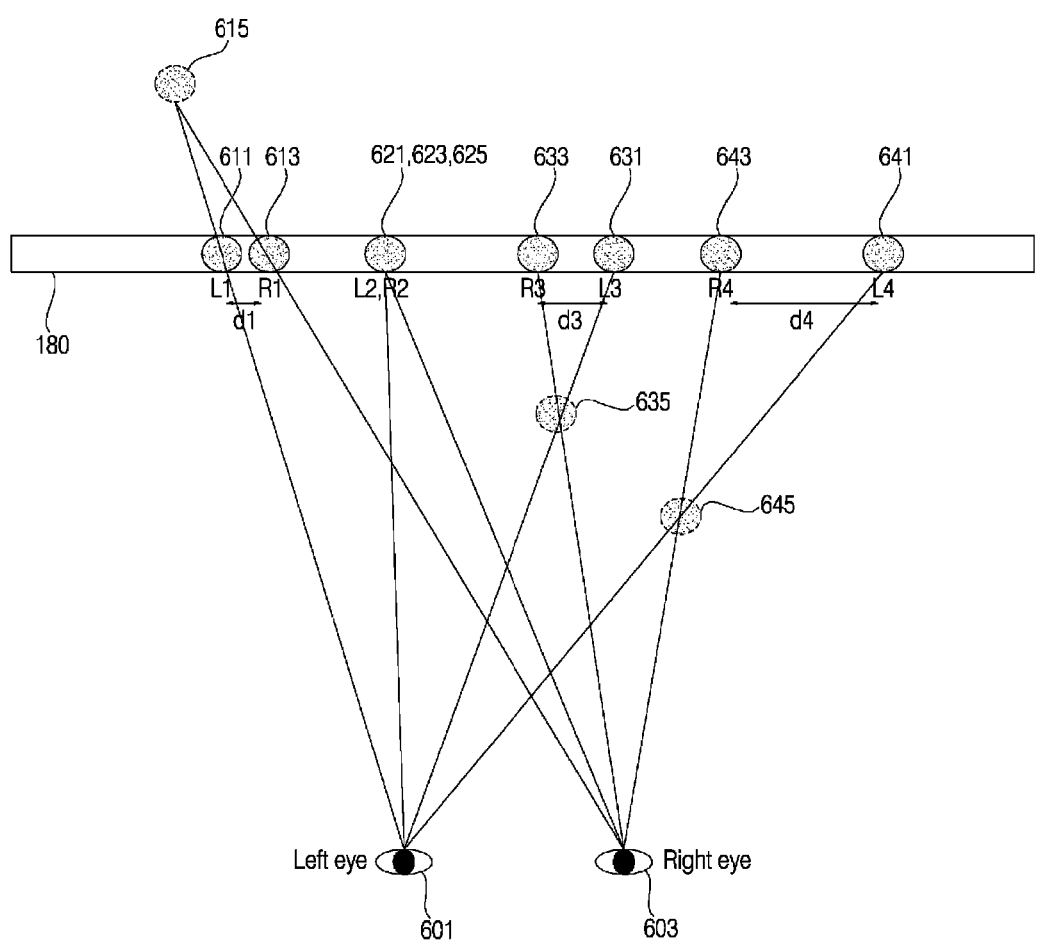
FIG. 7 illustrates formation of 3D images by combining left-eye and right-eye images.
Figure 8:
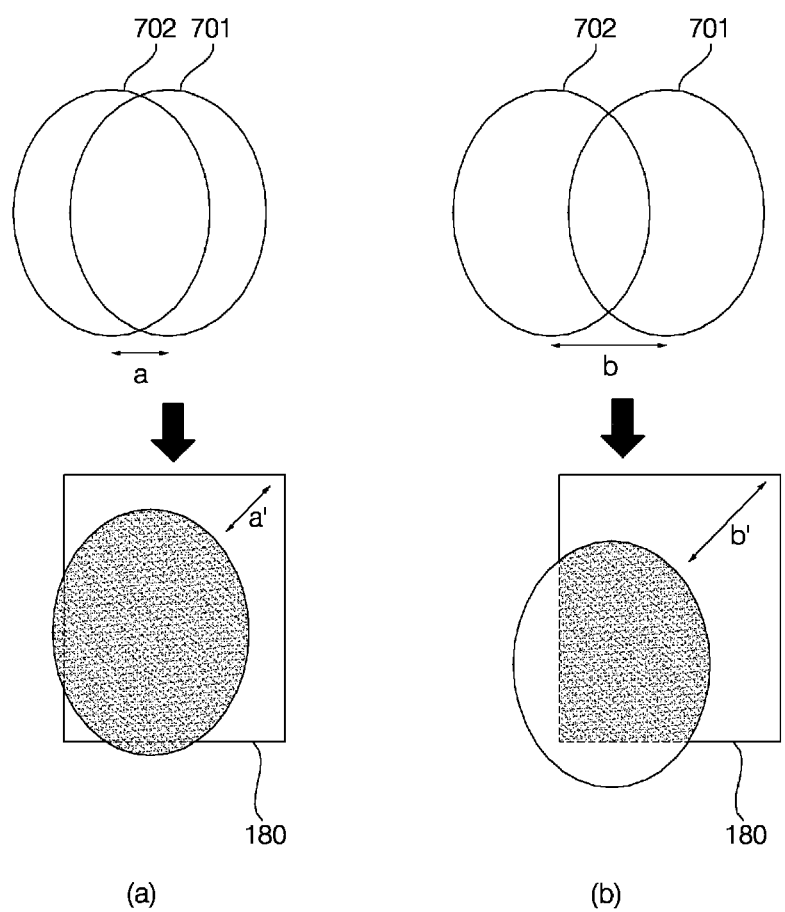
FIG. 8 illustrates different depth illusions of 3D images according to different disparities between a left-eye image and a right-eye image.

FIG. 7 illustrates formation of 3D images by combining left-eye and right-eye images and FIG. 8 illustrates different depth illusions according to different disparities between a left-eye image and a right-eye image.

Referring to FIG. 7, a plurality of images or objects 615, 625, 635 and 645 are present.

A first object 615 is created by combining a first left-eye image 611 (L1) based on a first left-eye image signal with a first right-eye image 613 (R1) based on a first right-eye image signal, with a disparity d1 between the first left-eye and right-eye images 611 and 613. The user sees an image as formed at the intersection between a line connecting a left eye 601 to the first left-eye image 611 and a line connecting a right eye 603 to the first right-eye image 613. Therefore, the user perceives the first object 615 as being located behind the display 180.

As a second object 625 is created by overlapping a second left-eye image 621 (L) with a second right-eye image 623 (R) on the display 180, with a disparity of 0 between the second left-eye and right-eye images 621 and 623. Thus, the user perceives the second object 625 as being on the display 180.

A third object 635 is created by combining a third left-eye image 631 (L) with a third right-eye image 633 (R), with a disparity d3 between the third left-eye and right-eye images 631 and 633. A fourth object 645 is created by combining a fourth left-eye image 641 (L) with a fourth right-eye image 643 (R), with a disparity d4 between the fourth left-eye and right-eye images 641 and 643.

The user perceives the third and fourth objects 635 and 645 at image-formed positions, that is, as being positioned before the display 180.

Because the disparity d4 between the fourth left-eye and right-eye images 641 and 643 is greater than the disparity d3 between the third left-eye and right-eye images 631 and 633, the fourth object 645 appears to be positioned closer to the viewer than the third object 635.

In embodiments of the present invention, the distances between the display 180 and the objects 615, 625, 635 and 645 are represented as depths. When an object is perceived as being positioned behind the display 180, the depth of the object is negative-signed. On the other hand, when an object is perceived as being positioned before the display 180, the depth of the object is positive-signed. Therefore, as an object appears closer to the user, it is deeper, that is, its depth is larger.

Referring to FIG. 8, the disparity a between a left-eye image 701 and a right-eye image 702 in FIG. 8(a) is smaller than the disparity b between the left-eye image 701 and the right-eye image 702 in FIG. 8(b). Consequently, the depth a' of a 3D object created in FIG. 8(a) is smaller than the depth b' of a 3D object created in FIG. 8(b).

In the case where a left-eye image and a right-eye image are combined into a 3D image, if the left-eye and right-eye images of 3D images are spaced apart from each other by different disparities, the 3D images are perceived as being formed at different positions. This means that the depth of a 3D image or 3D object formed with a left-eye image and a right-eye image in combination may be controlled by adjusting the disparity between the left-eye and right-eye images.

Figure 9:
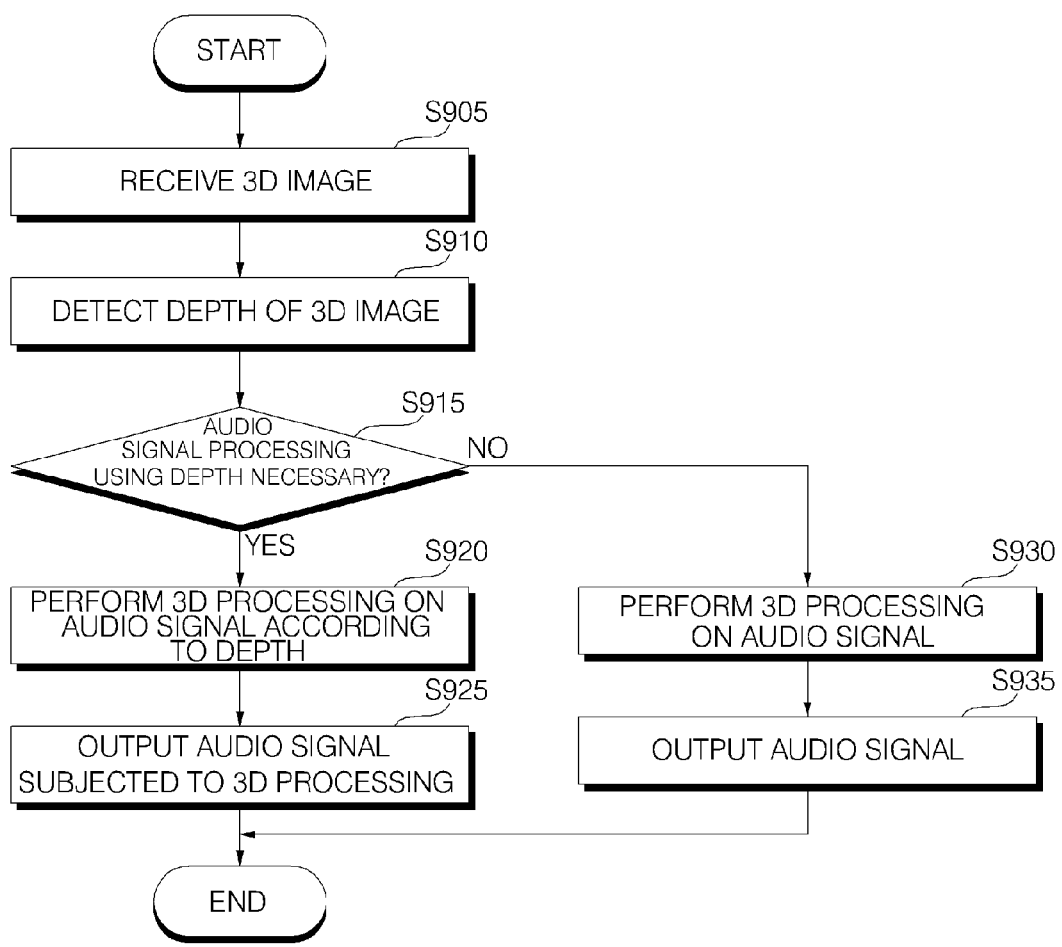
FIG. 9 is a flowchart illustrating a method for operating an image display apparatus according to an embodiment of the present invention.

FIG. 9 is a flowchart illustrating a method for operating an image display apparatus according to an embodiment of the present invention and FIGS. 10 to 15 are views referred to for describing various examples of the method for operating an image display apparatus, illustrated in FIG. 9.

Referring to FIG. 9, a 3D image is received (S905). The received 3D image may be an external image from the external device 190, an image received from a content provider over a network, a broadcast image of a broadcast signal received from the tuner 110, or an image stored in the memory 140.

The controller 170 may determine whether the received image is a 3D image. For example, the controller 170 may receive information indicating presence/absence of a 3D image within a header or metadata of the received image stream and determine whether the received image is a 3D image based on the information.

Next, the depth of the 3D image is detected (S910). The controller 170 may detect the depth of the 3D image during decoding of the received 3D image or during format conversion after decoding.

For example, if the received 3D image is coded using an MPEG-C part 3 scheme and is coded as a color image and a depth image, the video processor 220 decodes the depth image so as to detect the depth of the 3D image.

Such a depth may be generated in units of frames or in units of objects in a frame. For example, if one 3D object is included in the frame, the depth of the frame may be detected based on the depth of the object. In addition, if a plurality of 3D objects is included in the frame, an average of a plurality of depths may be obtained and calculated as the depth of the frame.

In addition, for example, if the received 3D image is coded using an MPEG-2 scheme and is coded as a left-eye image and a right-eye image, the left-eye image and the right-eye image may be decoded and then the depth may be detected from the disparity information between the left-eye image and the right-eye image. The formatter 260 of the controller 170 may detect the depth from the disparity information between the left-eye image and the right-eye image.

Next, it is determined whether 3D processing using the detected depth is necessary (S915). If so, 3D processing is performed upon the received audio signal in correspondence with the detected depth (S920) and the audio signal subjected to 3D processing is output (S925).

The controller 170 determines whether 3D processing using the depth is necessary. For example, the controller 170 may determine whether 3D processing is necessary depending on whether the change in depth is greater than or equal to a predetermined value. As another example, the controller

170 may determine whether 3D processing is necessary depending on whether the depth represents that the object is closer to the user.

If the change in depth is greater than or equal to the predetermined value or the detected depth is increased (that is, the object is closer to the user), an audio zooming signal may be changed from off to on. If the change in depth is less than a predetermined value or if the depth is decreased (that is, the object moves away from the user), an audio zooming signal may be changed from on to off.

The audio zooming signal input to the audio processor 230 may be received from the video processor 220 for decoding the depth image if the depth image is coded or the formatter 260 for detecting the depth from the disparity information between the left-eye image and the right-eye image, as described above.

If the audio zooming signal is on, the controller 170 performs 3D processing on the received audio signal in correspondence with the detected depth and outputs an audio signal subjected to 3D processing.

Figure 10:
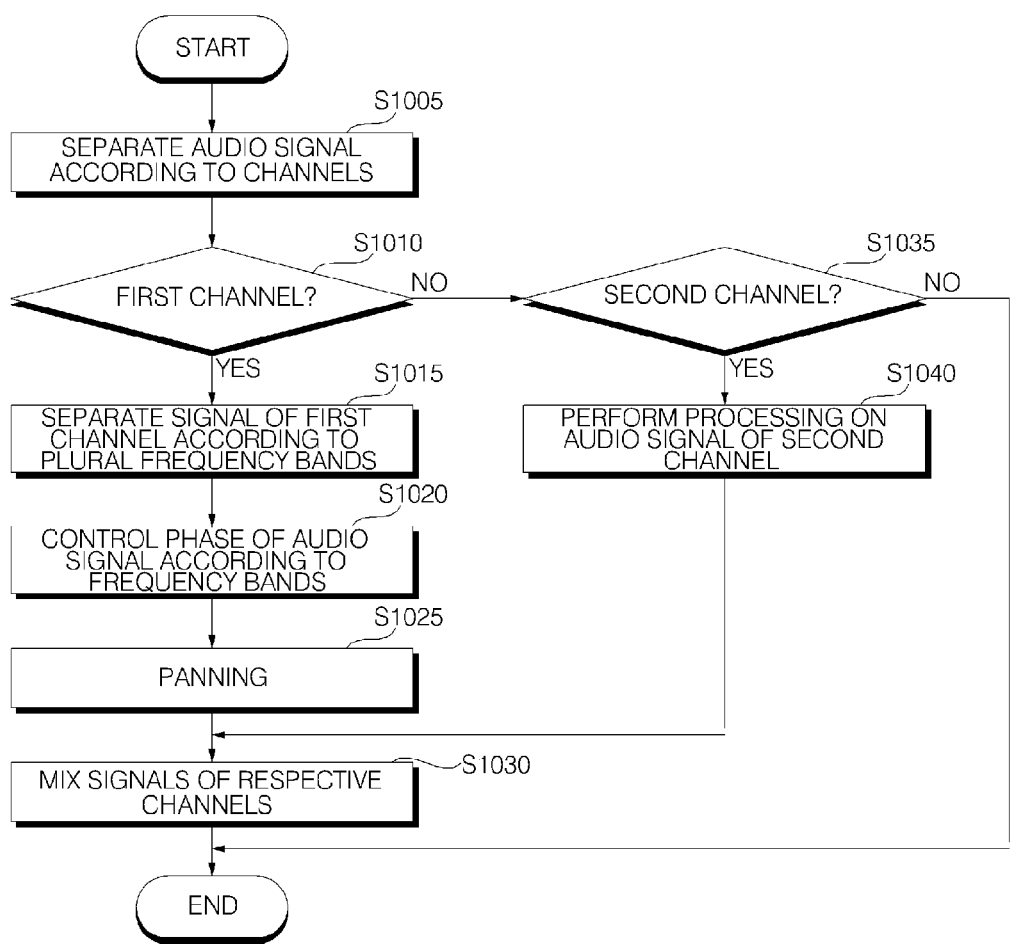
FIGS. 10 to 15 are views referred to for describing various examples of the method for operating an image display apparatus, illustrated in FIG. 9.

3D processing of the received audio signal may be performed as shown in FIG. 10.

First, the channel separator 420 separates the received audio signal according to channels (S1005). For example, the audio signal may be separated into a rear-channel audio signal and a front-channel audio signal. The rear-channel audio signal may be an audio signal output at the rear side of the image display apparatus 100 and the front-channel audio signal may be an audio signal output at the front side of the image display apparatus 100. Alternatively, the audio signal may be separated into 5.1-channel audio signals or a stereo audio signal may be separated into a left-channel audio signal and a right-channel audio signal.

Next, it is determined whether the separated audio signal is an audio signal of a first channel (S1010). If so, the frequency dependent phase controller 430 receives the audio signal of the first channel from the channel separator 420 and separates the audio signal of the first channel (for example, front channel) according to a plurality of frequency bands (S1015). The frequency dependent phase controller 430 controls the phase of the audio signal according to the plurality of frequency bands (S1020).

Such phase control may be performed based on the depth information. For example, if the phase of an audio signal having a predetermined frequency is delayed by 180 degrees, the audio signal is perceived as being output at a position closer to the user.

The phase of the audio signal is controlled in a z axis (a distance between the user and the display 180) by changing a phase angle in the frequency dependent phase controller 430.

Next, the panner 440 receives the audio signal from the channel separator 420 or the frequency dependent phase controller 430 and performs signal processing so as to pan the audio signal. The panner 440 may perform signal processing such that the sense of the direction of the audio signal is increased in terms of the left and right (x- and y-axis) directions of the display 180.

For example, the levels of a left-channel audio signal L and a right-channel audio signal R of the front channel signals are different. If the level of the left channel audio signal is greater than that of the right channel audio signal, the audio signal is output at the left channel so as to approach the vicinity of the right channel.

For example, output times of the right-channel audio signal and the output times of the right-channel audio signal and the left-channel audio signal are differently set, thus obtaining the above-described effect. Thus, the stereophonic effect of the audio signal is increased.

In step S1010, if the separated channel is not the first channel, it is determined whether the separated audio signal is an audio signal of a second channel (S1035). If so, the spatial diffuser 450 receives the audio signal of the second channel (for example, rear channel) from the channel separator 420 and controls spatial diffusion of the audio signal of the second channel (S1040). For spatial diffusion, the spatial diffuser 450 adds reverb to the rear-channel audio signal, delays the rear-channel audio signal or increases the level of the rear-channel audio signal, thereby increasing the stereoscopic effect of the channel.

Next, the mixer 460 mixes the audio signal of the first channel and the audio signal of the second channel separated by the channel separator 420 and outputs the mixed audio signal (S1030). The mixed audio signal may be input to the audio output unit 185.

Figure 11:
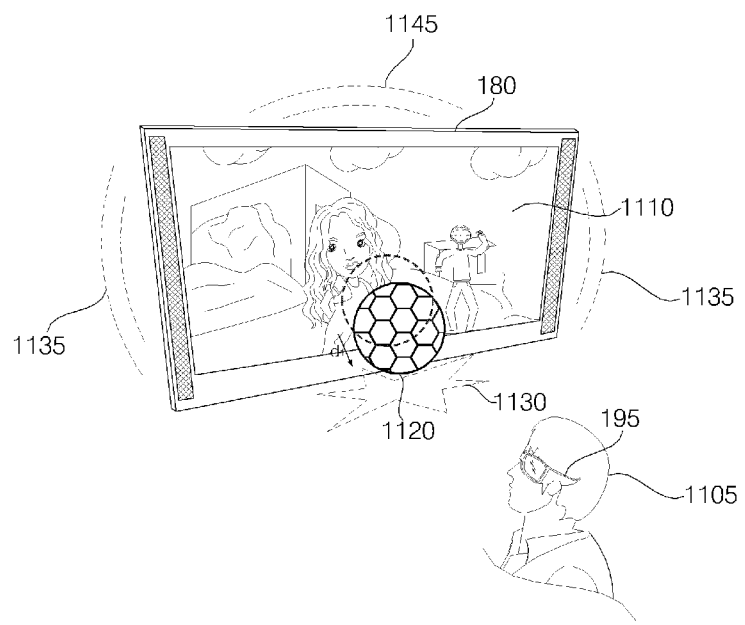

FIG. 11 shows the case where which a 3D image 1110 including a 3D object 1120 having a depth d1 is displayed on the display 180. The audio output unit 185 outputs the audio signal processed in synchronization with the 3D image.

At this time, since the depth $d_1$ is less than a predetermined value, the received audio signal is output without conversion. That is, the audio signal 1135 of the front channel (the left channel and the right channel) and the audio signal 1145 of the rear channel are output without conversion. The output audio signal does not provide a stereophonic sound effect corresponding to the depth to the user 1105 who wears the 3D viewing device 195 and views the image 1110. That is, the audio signal 1130 is output at a position spaced apart from the user 1105.

Figure 12:
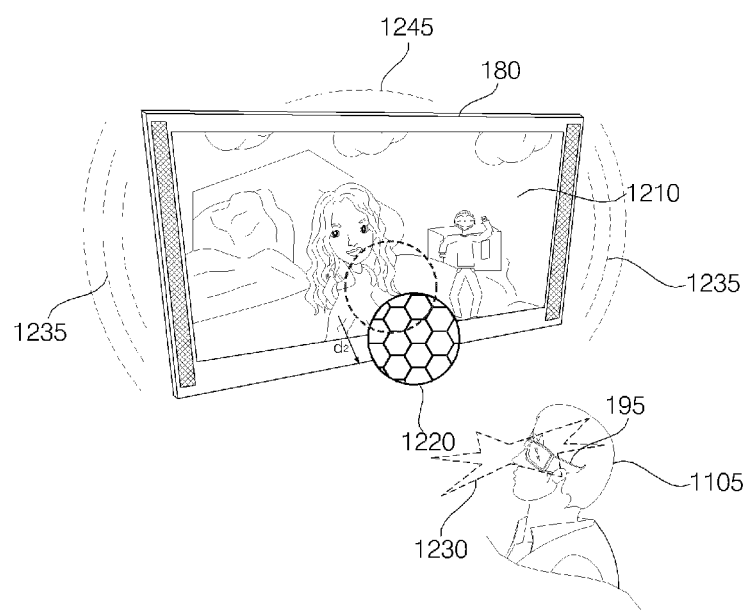

Next, FIG. 12 shows the case where a 3D image 1210 including a 3D object 1220 having a depth $d_2$ is displayed on the display 180. Since the depth is increased as compared to FIG. 11 and is greater than or equal to a predetermined value, the received audio signal is subjected to 3D processing.

As described above, the audio signal is output at a position closer to the user by controlling the phase of the signal of a specific channel.

Figure 13:
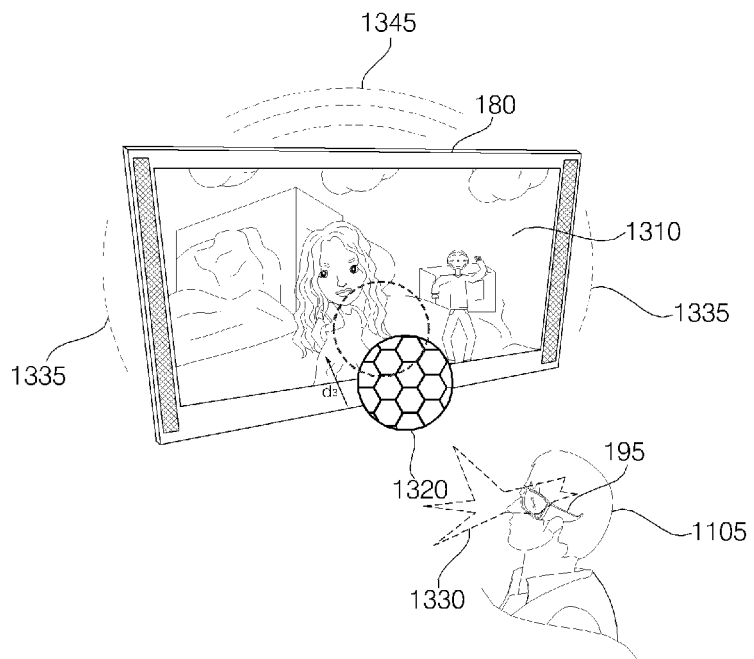

In FIG. 13, the level of the audio signal 1235 of the front channel (the left channel and the right channel) is increased and the level of the audio signal 1245 of the rear channel is decreased. The output audio signal is output in the vicinity of the user 1105 who wears the 3D viewing device 195 and views the image 1210. Accordingly, a stereophonic sound effect can be implemented according to the depth of the 3D image.

Contrary to FIG. 12, in FIG. 13, an image 1310 in which a 3D object 1320 having a depth $d_2$ is moved to the inside of the display 180 is displayed. The depth has a value of 0.

In this case, since the change in depth is $-d_2$, it may be determined that the change in depth is greater than or equal to the predetermined value. Accordingly, the received audio signal is subjected to 3D processing. The inverse process of the process of FIG. 12 is preferably performed.

In FIG. 13, the level of the audio signal 1335 of the front channel (the left channel and the right channel) is decreased and the level of the audio signal 1345 of the rear channel is increased. The output audio signal 1330 is output in the vicinity of the user 1105 who wears the 3D viewing device 195 and views the image 1210. Accordingly, the stereophonic sound effect can be implemented according to the depth of the 3D image.

Although 3D processing is performed on the audio signal according to the depth of the object included in the image in FIGS. 11 to 13, the present invention is not limited thereto and, if a plurality of objects is included in an image, 3D processing of the audio signal is performed using the respective depths of the objects, that is, an average depth of the objects. 3D processing of the audio signal corresponding to each object may be separately performed based on the depth of each object.

Figure 14:
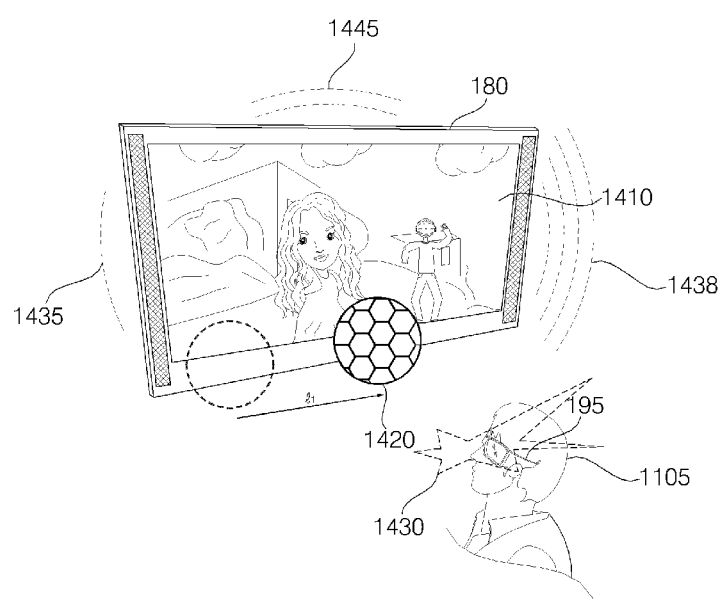
Figure 15:
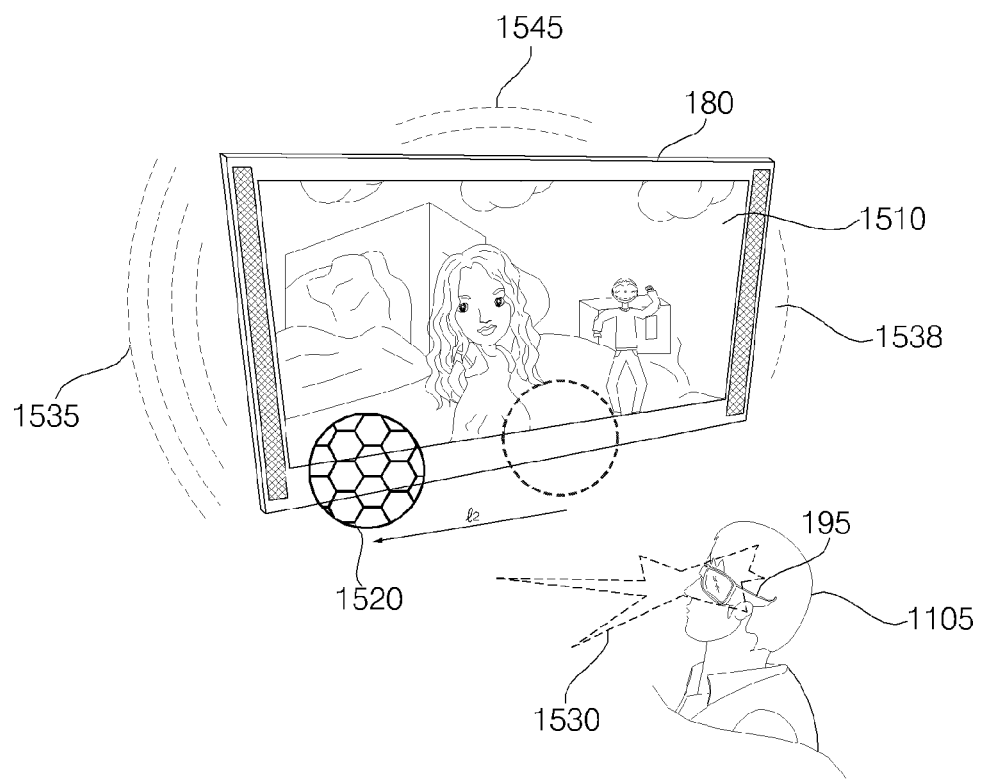

Next, FIGS. 14 and 15 show the case where the audio signal is subjected to 3D processing and output according to the movement of a 3D object in a 3D image.

First, FIG. 14 shows the case where a 3D image 1410 including a 3D object 1420 having a predetermined depth is displayed on the display 180. At this time, the 3D object 1420 is moved from the left side to the central portion of the display 180 by a distance $l_1$.

If the depth is not changed but a variation in movement distance is greater than or equal to a predetermined value, the received audio signal may be subjected to 3D processing. That is, even when the audio signal of the rear channel is not changed as compared to FIG. 11, the volume or the sense of direction of the audio signals of the left channel and the right channel of the front channel may be differently set.

In FIG. 14, the level of the audio signal 1435 of the front left channel is decreased and the level of the audio signal 1438 of the front right channel is increased. The output audio signal is output in the vicinity of the user 1105 who wears the 3D viewing device 195 and views the image 1410 and the level of the audio signal of the right channel is increased. Accordingly, the stereophonic sound effect can be implemented according to the depth of the 3D image.

Next, FIG. 15 shows the case where a 3D image 1510 including a 3D object 1520 having a predetermined depth is displayed on the display 180. At this time, the 3D object 1520 is moved from the left side to the central portion of the display 180 by a distance $l_2$.

If the depth is not changed but a variation in movement distance is greater than or equal to a predetermined value, the received audio signal may be subjected to 3D processing. That is, even when the audio signal of the rear channel is not changed as compared to FIG. 11, the volume or the sense of direction of the audio signals of the left channel and the right channel of the front channel may be differently set.

In FIG. 15, the level of the audio signal 1535 of the front left channel is increased and the level of the audio signal 1538 of the front right channel is decreased. The output audio signal 1530 is output in the vicinity of the user 1105 who wears the 3D viewing device 195 and views the image 1510 and the level of the audio signal of the left channel is increased. Accordingly, the stereophonic sound effect can be implemented according to the depth of the 3D image.

Figure 16:
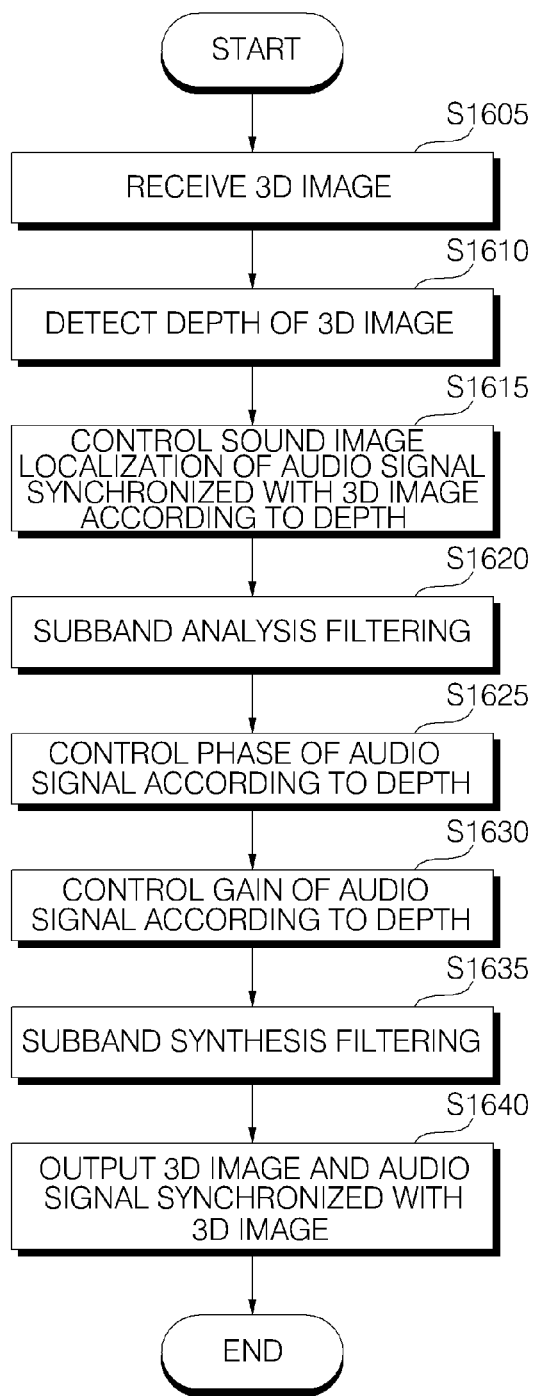
FIG. 16 is a flowchart illustrating a method for operating an image display apparatus according to another embodiment of the present invention.

FIG. 16 is a flowchart illustrating a method for operating an image display apparatus according to another embodiment of the present invention, and FIGS. 17 to 21 are views referred to for describing various examples of the method for operating an image display apparatus, illustrated in FIG. 16.

Referring to FIG. 16, first, a 3D image is received (S1605). The depth of the 3D image is detected (S1610). Steps S1605 and S1610 correspond to steps S910 and S915 and a description thereof will be omitted.

The depth detected by the formatter 260 may be input to the audio processor 230 as shown in FIGS. 2 and 4B.

Next, sound image localization of the audio signal synchronized with the 3D image is controlled in correspondence with the detected depth (S1615).

As described with reference FIG. 4B, the sound image localization unit 425 of the audio processor 230 controls sound image localization. In particular, in the embodiment of the present invention, HRTF filtering is performed according to the depth such that sound image localization is controlled according to depth.

Figure 17:
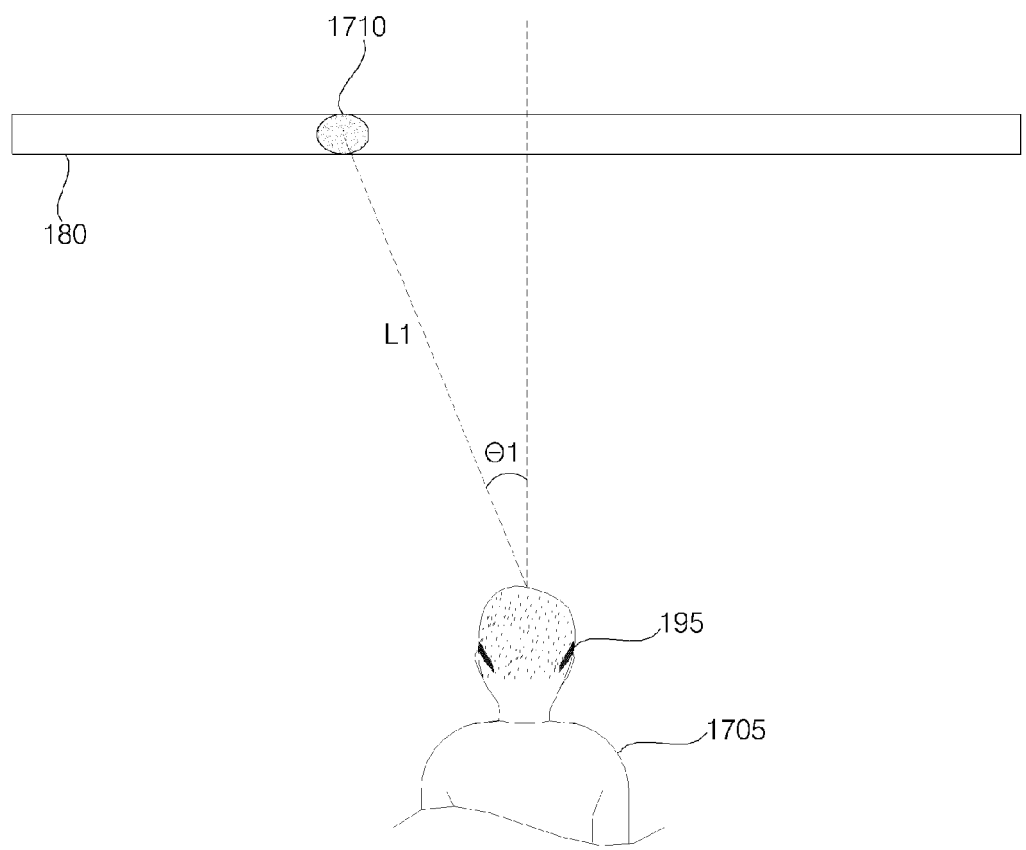
FIGS. 17 to 21 are views referred to for describing various examples of the method for operating an image display apparatus, illustrated in FIG. 16.
Figure 18:
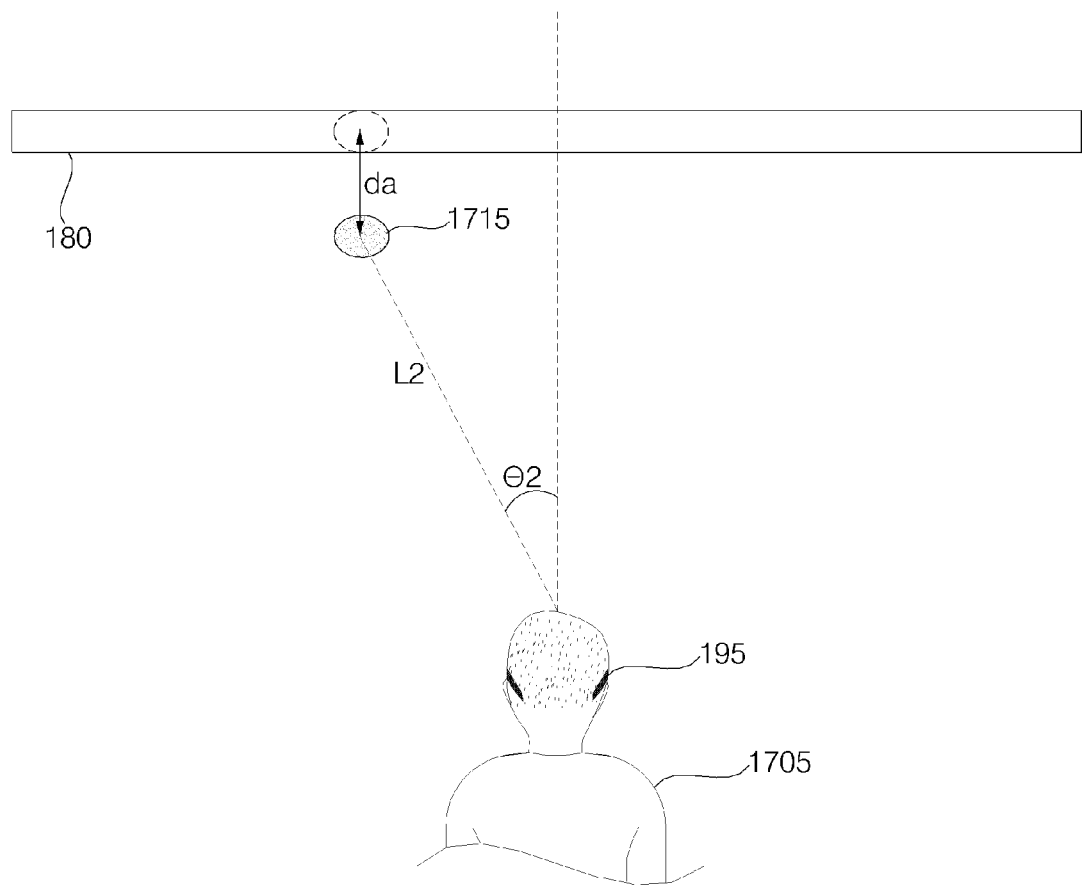
Figure 19:
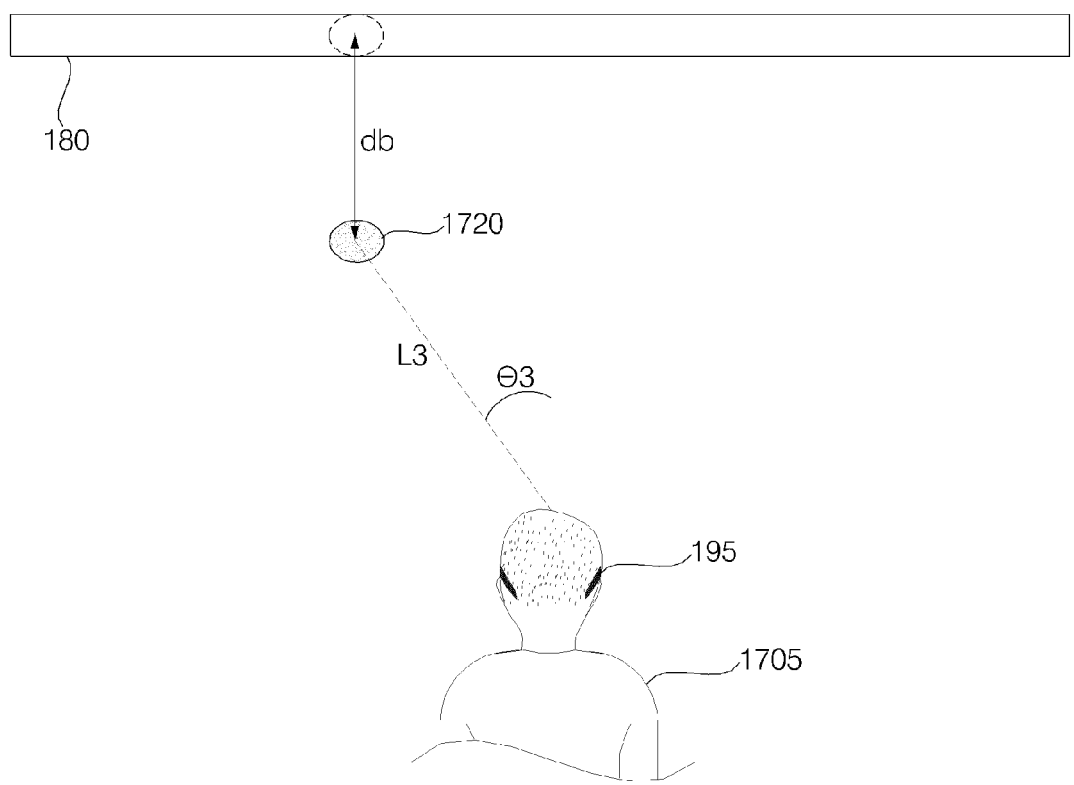

Referring to FIGS. 17 to 19, FIG. 17 shows the case where an object 1710 is positioned at the display 180. If it is assumed that a sound source is present in the object 1710, an angle between the sound source and a listener is set to θ1 and a distance therebetween is set to L1.

Next, FIG. 18 shows the case where a 3D object 1715 has a depth da and protrudes from the display 180 unlike FIG. 17. If it is assumed that a sound source is present in the 3D object 1715, an angle between the sound source and a listener is set to θ2 and a distance therebetween is set to L2.

Next, FIG. 19 shows the case where a 3D object 1720 has a depth db and further protrudes from the display 180 than in FIG. 18. If it is assumed that a sound source is present in the 3D object 1720, an angle between the sound source and a listener is set to θ3 and a distance therebetween is set to L3.

In FIG. 17, the angle between the object without a depth and the listener 1705 is set to θ1 which is the smallest among the angles set in FIGS. 17 to 19 and the distance therebetween is set to L1 which is the largest among the distances set in FIGS. 17 to 19. In FIG. 18, the angle between the object having the depth da less than a predetermined value and the listener 1705 is set to θ2 which is an intermediate value among the angles set in FIGS. 17 to 19 and the distance therebetween is set to a L2 which is an intermediate value among the distances set in FIGS. 17 to 19. In FIG. 19, the angle between the object having the depth db greater than or equal to the predetermined value and the listener 1705 is set to θ3 which is the largest among the angles set in FIGS. 17 to 19 and the distance therebetween is set to a L3 which is the smallest among the distances set in FIGS. 17 to 19.

In the embodiment of the present invention, as shown in FIGS. 17 to 19, if the 3D images have different depths, previously measured HRTFs are provided in correspondence with the respective depths and HRTF filtering is performed according to the depths. Thus, sound image localization can be controlled according to depth.

Although not shown, after sound image localization is controlled, as described with reference to FIG. 4B, crosstalk cancellation may be performed. That is, in order to prevent crosstalk between the left-channel audio signal and the right-channel audio signal, the sound image localization of which is controlled, an additional audio signal (e.g., a reverb signal) may be generated and added.

Next, subband analysis filtering is performed (S1620). As described with reference to FIG. 4B, the subband analysis unit 445 of the audio processor 230 performs subband analysis filtering with respect to the audio signal, the sound image localization of which is controlled. That is, the subband analysis unit 445 includes a subband analysis filter bank and filters an audio signal having predetermined frequency subbands among the audio signal, the sound image localization of which is controlled. The number of subbands of the audio signal filtered by the subband analysis unit 445 may be 32 or 64.

Next, the phase of the audio signal is controlled in correspondence with the detected depth (S1625). As described with reference to FIG. 4B, the frequency dependent phase controller 455 of the audio processor 230 controls the phase of the audio signal according to the frequency bands. The phase of the audio signal may be controlled based on the detected depth information. As the depth of the 3D image is increased, the phase is preferably increased. The phase of the audio signal is preferably increased. As the change in depth of the 3D image is increased, the phase of the audio signal may be increased. For example, if the phase of the audio signal having a predetermined frequency is increased by 180 degrees, the audio signal may be perceived as being output at a position closer to a user.

The phase control method may be performed using various methods. For example, a specific frequency range may be divided into a plurality of frequency bands and the signs of the phases of the signals of the respective channels may be changed according to the plurality of frequency bands, a plurality of frequency bands in a specific frequency range may be grouped and the signs of the phases of the signals of the respective channels may be changed according to frequency band groups, the phases of the signals of the channels in the entire frequency band may be independently controlled, a specific frequency range is divided into a plurality of frequency bands and the phases of the signals of the channels may be controlled according to the plurality of frequency bands, or frequency bands in a specific frequency range may be grouped and the phases of the signals of the channels may be controlled according to the frequency band groups.

Next, the gain of the audio signal is controlled according to the detected depth (S1630). As described with reference to FIG. 4B, the frequency dependent gain controller 450 of the audio processor 230 controls the gain of the audio signal according to the frequency bands. Gain control may be performed based on the depth of the 3D image or the change in depth of the 3D image. The gain is preferably increased as the depth of the 3D image or the change in depth of the 3D image is increased.

For example, if the depth of the 3D image is doubled, the gain of the audio signal increases fourfold. If the depth of the 3D image increases fourfold, the gain of the audio signal increases eightfold. A zooming band of the audio signal may be emphasized according to the depth of the 3D image.

The gain control method may be performed using various methods. For example, the gains of the audio signal may be independently controlled in the entire frequency band a, a specific frequency range may be divided into a plurality of frequency bands and the gains of the audio signal may be controlled according to the plurality of frequency bands, or a plurality of frequency bands may be grouped and the gains of the audio signal may be controlled according to frequency band groups.

Next, subband synthesis filtering is performed (S1635). The 3D image and the audio signal synchronized with the 3D image are output (S1640).

As described with reference to FIG. 4B, the subband synthesis unit 475 of the audio processor 230 performs subband synthesis filtering with respect to the audio signal, the phase or the gain of which is controlled. That is, the subband synthesis unit 475 includes a subband synthesis filter bank and synthesizes the 32 subbands or 64 subbands. Finally, an audio signal which is subjected to sound image localization, phase control and gain control is output according to the depth of the 3D image. The audio signal is zoomed according to the depth of the 3D image so as to be output in front of the head of the listener.

Figure 20:
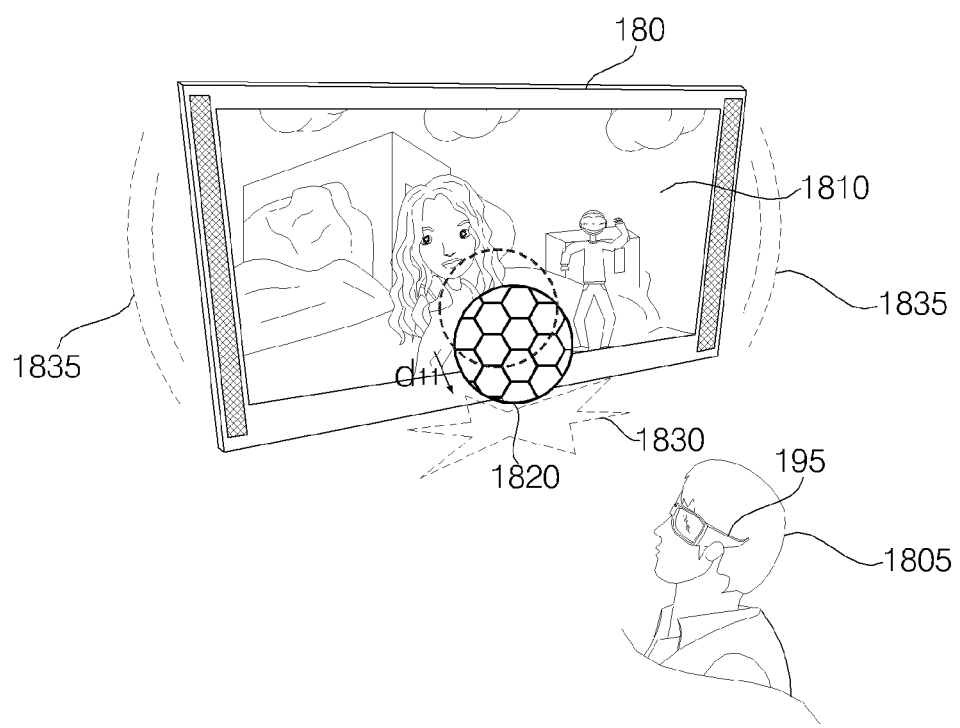

FIG. 20 shows the case where a 3D image 1810 including a 3D object having a depth d11 is displayed on the display 180. Then, the audio output unit 185 outputs the audio signal which is processed in synchronization with the 3D image.

At this time, since the depth $d_{11}$ is less than a predetermined value, the received audio signal is output without conversion. That is, the audio signal 1835 of the front channel (the left channel and the right channel) is output without conversion. The output audio signal does not provide a stereophonic sound effect corresponding to the depth to the user 1805 who wears the 3D viewing device 195 and views the image 1110. That is, the audio signal 1830 is output at a position spaced apart from the user 1805.

Figure 21:
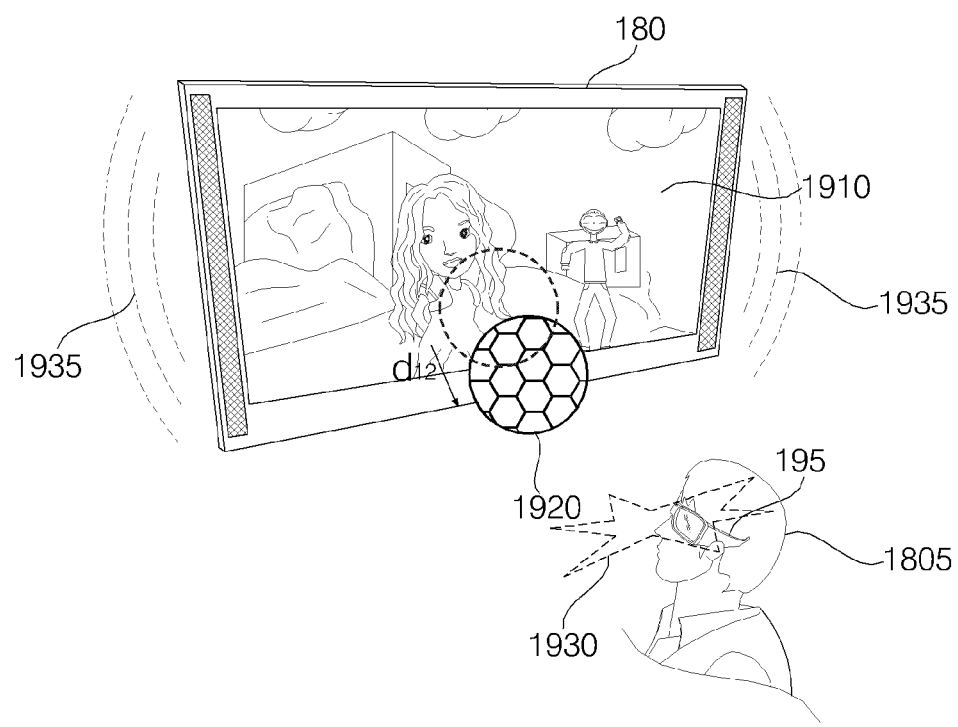

Next, FIG. 21 shows the case where a 3D image 1910 including a 3D object 1920 having a depth $d_{12}$ is displayed on the display 180. Since the depth is increased as compared to FIG. 18 and is greater than or equal to a predetermined value, the received audio signal is subjected to 3D processing such as sound image localization, phase control or gain control.

As described above, the audio signal is output at a position closer to the user by controlling the phase of a specific channel signal.

In FIG. 21, the levels of the audio signals 1935 of the left channel and the right channel are increased. The audio signal 1930 is output in the vicinity of the user 1805 who wears the 3D viewing device 195 and views the image 1910. Accordingly, the stereophonic sound effect can be implemented according to the depth of the 3D image.

Although 3D processing of the audio signal is performed according to the depth of the object included in the image in FIGS. 20 to 21, the present invention is not limited thereto and, if a plurality of objects is included in an image, 3D processing of the audio signal may be performed using the respectively depths of the objects, that is, an average depth of the objects. 3D processing of the audio signal corresponding to each object may be separately performed based on the depth of each object.

The image display apparatus and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

According to the embodiment of the present invention, since an audio signal is subjected to 3D processing in correspondence with the depth of a 3D image during 3D image display, it is possible to output stereophonic sound. Thus, it is possible to increase user convenience.

In addition, since an audio signal is subjected to 3D processing in correspondence with movement of an object within a 3D image during 3D image display, it is possible to output stereophonic sound. Thus, it is possible to increase user convenience.

Since an audio signal is subjected to 3D processing in consideration of the depth of an object within a 3D image as well as the depth of the 3D image, it is possible to provide realistic stereophonic sound.

In the case where a plurality of objects is included in a 3D image, since an audio signal is subjected to 3D processing using an average of the depths of the objects, it is possible to provide realistic stereophonic sound.

In the case where a plurality of objects is included in a 3D image, since an audio signal is subjected to 3D processing using the individual depth of each object, it is possible to provide realistic stereophonic sound.

According to another embodiment of the present invention, since an audio signal is subjected to sound image localization, phase control or gain control in correspondence with the depth of a 3D image during 3D image display, it is possible to output stereophonic sound. Thus, it is possible to increase user convenience.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus, the method comprising:
   receiving a 3-dimensional (3D) image;
   detecting a depth of the 3D image;
   performing 3D processing on an audio signal received in synchronization with the 3D image in correspondence with the detected depth; and
   outputting the audio signal subjected to 3D processing,
   wherein the performing the 3D processing includes controlling sound image localization of the audio signal received in synchronization with the 3D image in correspondence with the detected depth, and
   wherein the controlling the sound image localization includes performing filtering of a Head-Related Transfer Function (HRTF), a coefficient of which is changed according to the depth, with respect to the audio signal.

2. The method according to claim 1, wherein the performing 3D processing further includes performing at least one of phase control, time delay or level change of the received audio signal in correspondence with the detected depth.

3. The method according to claim 1, wherein the performing 3D processing further includes:
   separating the received audio signal according to channels;
   separating an audio signal of a first channel among the audio signals according to frequency bands and controlling a phase of the audio signal of the first channel; and
   panning the audio signal, the phase of which is controlled.

4. The method according to claim 3, wherein the performing 3D processing further includes:
   performing spatial diffusion processing on an audio signal of a second channel among the separated audio signals; and
   mixing the audio signal of the second channel subjected to spatial diffusion processing with the panned audio signal of the first channel, the phase of which is controlled.

5. The method according to claim 1, wherein the performing 3D processing further includes performing 3D processing on the audio signal according to objects in correspondence with the detected depth, if a plurality of objects is included in the 3D image.

6. The method according to claim 5, wherein the performing 3D processing further includes performing 3D processing on the audio signal of the 3D image in correspondence with an average depth of the objects if the plurality of objects is included in the 3D image.

7. The method according to claim 1, further comprising:
   detecting movement of an object within the 3D image,
   wherein the performing 3D processing includes performing at least one of phase control, time delay or level change of the received audio signal according to a movement direction of the object if the object of the 3D image is moved.

8. A method for operating an image display apparatus, the method comprising:
   receiving a 3-dimensional (3D) image;
   detecting a depth of the 3D image; and
   controlling sound image localization of an audio signal received in synchronization with the 3D image in correspondence with the detected depth,
   wherein the controlling the sound image localization includes performing filtering of a Head-Related Transfer Function (HRTF), a coefficient of which is changed according to the depth, with respect to the audio signal.

9. The method according to claim 8, further comprising:
   canceling crosstalk of the audio signal, the sound image localization of which is controlled.

10. The method according to claim 8, further comprising:
    performing subband analysis filtering with respect to the audio signal, the sound image localization of which is controlled.

11. The method according to claim 8, further comprising:
    controlling a phase or a gain of the audio signal according to frequency bands, in correspondence with the detected depth or change in depth.

12. The method according to claim 11, further comprising:
    performing subband synthesis filtering with respect to the audio signal, the phase or the gain of which is controlled according to the frequency bands.

13. An image display apparatus comprising:
    a display configured to display an image;
    an audio output unit configured to output an audio signal; and
    a controller configured to detect the depth of a 3-dimensional (3D) image or movement of an object within the 3D image, perform 3D processing on an audio signal received in synchronization with the 3D image in correspondence with the detected depth or movement, and output the audio signal subjected to 3D processing,
    wherein the controller includes a sound image localization unit configured to control sound image localization of the audio signal received in synchronization with the 3D image in correspondence with the depth of the 3D image, and
    wherein the controlling the sound image localization includes performing filtering of Head-Related Transfer Function (HRTF), a coefficient of which is changed according to the depth, with respect to the audio signal.

14. The image display apparatus according to claim 13, wherein the controller performs at least one of phase control, time delay or level change of the input audio signal in correspondence with the detected depth during 3D processing.

15. The image display apparatus according to claim 13, wherein the controller includes:
    a channel separator configured to separate the received audio signal according to channels;
    a phase controller configured to separate an audio signal of a first channel among the separated audio signals according to frequency bands and control a phase of the audio signal of the first channel; and
    a panner configured to pan the audio signal, the phase of which is controlled.

16. The image display apparatus according to claim 15, wherein the controller includes:
    a spatial diffuser configured to perform spatial diffusion processing on an audio signal of a second channel among the separated audio signals; and a mixer configured to mix the audio signal of the second channel subjected to spatial diffusion processing with the panned audio signal of the first channel subjected to phase control.

17. The image display apparatus according to claim 13, wherein the controller includes:
a phase controller configured to control a phase of the audio signal according to frequency bands in correspondence with the depth or change in depth of the 3D image; and
a gain controller configured to control gain of the audio signal according to the frequency bands in correspondence with the depth or change in depth of the 3D image.

18. The image display apparatus according to claim 13, wherein the controller includes a formatter configured to detect the depth of the 3D image.

* * * * *